US012571341B2

(12) United States Patent
Kerton

(10) Patent No.: US 12,571,341 B2
(45) Date of Patent: Mar. 10, 2026

(54) VENTURI DEVICE WITH FORCED INDUCTION

(71) Applicant: Zero Nox, Inc., Porterville, CA (US)

(72) Inventor: James Matthew Kerton, Duncan (CA)

(73) Assignee: Zero Nox, Inc., Porterville, CA (US)

( * ) Notice: Subject to any disclaimer, the term of this patent is extended or adjusted under 35 U.S.C. 154(b) by 0 days.

(21) Appl. No.: 18/556,322

(22) PCT Filed: Apr. 26, 2022

(86) PCT No.: PCT/US2022/026399

§ 371 (c)(1),
(2) Date: Oct. 19, 2023

(87) PCT Pub. No.: WO2022/232182

PCT Pub. Date: Nov. 3, 2022

(65) Prior Publication Data

US 2024/0191650 A1 Jun. 13, 2024

Related U.S. Application Data

(63) Continuation-in-part of application No. PCT/IB2021/000237, filed on Apr. 27, 2021.

(30) Foreign Application Priority Data

Apr. 27, 2021 (WO) .................. PCT/IB2021/000237

(51) Int. Cl.
*F02B 37/22* (2006.01)
*F02B 37/18* (2006.01)
(Continued)

(52) U.S. Cl.
CPC .......... *F02B 37/225* (2013.01); *F02B 37/183* (2013.01); *F02M 26/10* (2016.02); *F02M 26/19* (2016.02)

(58) Field of Classification Search
CPC ...... F02B 37/225; F02B 37/183; F02B 37/00; F02B 31/04; F02M 26/10; F02M 26/19;
(Continued)

(56) References Cited

U.S. PATENT DOCUMENTS 1,329,559 A 2/1920 Tesla
1,626,487 A 4/1927 Warren
(Continued)

FOREIGN PATENT DOCUMENTS

CN 106532178 A 3/2017
CN 114243848 A 3/2022
(Continued)

OTHER PUBLICATIONS

International Search Report/Written Opinion dated Aug. 11, 2022; in International Application No. PCT/US2022/026399, filed Apr. 26, 2022; in 15 pages.
(Continued)

*Primary Examiner* — Dapinder Singh
(74) *Attorney, Agent, or Firm* — Knobbe, Martens, Olson & Bear, LLP

(57) ABSTRACT

A Venturi device with a primary flow path and a secondary flow path introduced into the primary flow path, wherein a flow of one or more flowable mediums in the primary flow path and the secondary flow path creates a vortex generating a suction at an inlet of the Venturi device. Systems incorporating the Venturi device in which the primary flow path is charged with energy in the form of thermal energy from the ambient environment through the flow-induced vortex formation. Supercharger systems incorporating the Venturi device, wherein the primary flow of air into an engine is compressed with exhaust gases recirculated through the secondary flow path.

27 Claims, 7 Drawing Sheets

(51) Int. Cl.
*F02M 26/10* (2016.01)
*F02M 26/19* (2016.01)

(58) Field of Classification Search
CPC ........ F02M 26/05; F02M 26/15; F02M 26/14; F02M 26/13; F02M 26/17; F02M 35/10118; F02C 1/10; F04F 5/18; F04F 5/16; F03G 7/047; F15D 1/009; F01N 13/00; F01N 13/10; F01N 13/08; F01N 13/082; F01N 2270/00; F01N 2270/02; F01N 2270/06; F01N 2270/08; F01N 2270/10; Y02T 10/12
See application file for complete search history.

(56) References Cited

U.S. PATENT DOCUMENTS

| | | | |
|---|---|---|---|
| 2,396,290 | A | 3/1946 | Schwarz |
| 4,245,961 | A | 1/1981 | Bunting |
| 4,372,113 | A | 2/1983 | Ramer |
| 4,388,045 | A | 6/1983 | Simon |
| 4,443,707 | A | 4/1984 | Scieri et al. |
| 6,138,456 | A | 10/2000 | Garris |
| 6,267,106 | B1 | 7/2001 | Feucht |
| 6,422,828 | B1 | 7/2002 | Beerlings |
| 6,886,545 | B1 | 5/2005 | Holm |
| 7,032,578 | B2 * | 4/2006 | Liu .................. F02M 35/10222 123/568.17 |
| 8,056,340 | B2 * | 11/2011 | Vaught ................... F02M 26/19 60/611 |
| 8,664,781 | B2 | 3/2014 | Alvi |
| 8,807,458 | B2 | 8/2014 | Al-Ansary |
| 9,564,664 | B2 | 2/2017 | Tanigaki et al. |
| 9,567,856 | B2 | 2/2017 | Faller |
| 9,827,872 | B1 | 11/2017 | Sloan et al. |
| 10,625,868 | B2 * | 4/2020 | daSilva ..................... F04F 5/20 |
| 2004/0173192 | A1 * | 9/2004 | Sorter .................... F02M 26/19 123/568.18 |
| 2009/0075160 | A1 | 3/2009 | Tezuka et al. |
| 2009/0183858 | A1 | 7/2009 | Williams et al. |
| 2009/0205745 | A1 | 8/2009 | Farese et al. |
| 2010/0276517 | A1 | 11/2010 | Alansary |
| 2011/0144947 | A1 | 6/2011 | Myougan et al. |
| 2013/0298532 | A1 | 11/2013 | Hamad et al. |
| 2013/0333354 | A1 | 12/2013 | Hamad |
| 2014/0056687 | A1 | 2/2014 | Younes et al. |
| 2014/0292283 | A1 | 10/2014 | Timmons et al. |
| 2016/0153404 | A1 * | 6/2016 | Guidi ..................... F02M 26/06 123/568.17 |
| 2016/0319778 | A1 | 11/2016 | Shuto et al. |
| 2016/0369674 | A1 | 12/2016 | Younes et al. |
| 2017/0074213 | A1 | 3/2017 | Hamad et al. |
| 2017/0373511 | A1 | 12/2017 | Jo |
| 2018/0016017 | A1 | 1/2018 | Dasilva et al. |
| 2019/0085758 | A1 * | 3/2019 | Kurtz .................... F02D 41/005 |
| 2019/0097434 | A1 | 3/2019 | Kim |
| 2019/0120106 | A1 | 4/2019 | Hamad |
| 2019/0198945 | A1 | 6/2019 | Machida et al. |
| 2019/0288527 | A1 | 9/2019 | Jaensch et al. |
| 2020/0171975 | A1 | 6/2020 | Ueda et al. |
| 2020/0256266 | A1 * | 8/2020 | Mastbergen ........... F02M 26/10 |
| 2020/0325861 | A1 | 10/2020 | Voice et al. |
| 2021/0135461 | A1 | 5/2021 | Wang et al. |
| 2021/0206290 | A1 | 7/2021 | Li et al. |
| 2022/0126724 | A1 | 4/2022 | O'Connor et al. |
| 2022/0140620 | A1 | 5/2022 | Kang et al. |
| 2024/0350989 | A1 | 10/2024 | Kerton |

FOREIGN PATENT DOCUMENTS

| | | | |
|---|---|---|---|
| DE | 10228865 | A1 | 1/2004 |
| EP | 2093475 | A1 | 8/2009 |
| EP | 3093475 | A1 | 11/2016 |
| EP | 3037300 | B1 | 12/2019 |
| EP | 3895933 | A1 | 10/2021 |
| EP | 4314514 | A1 | 2/2024 |
| EP | 4437222 | A1 | 10/2024 |
| EP | 4448952 | A1 | 10/2024 |
| GB | 0552747 | A | 4/1943 |
| GB | 2516612 | A | 2/2015 |
| GB | 2571135 | A | 8/2019 |
| JP | 5760097 | B2 | 8/2015 |
| JP | 5841294 | B2 | 1/2016 |
| JP | 6267375 | B2 | 1/2018 |
| JP | 6325516 | B2 | 5/2018 |
| JP | 6763889 | B2 | 9/2020 |
| JP | 2021-522440 | A | 8/2021 |
| JP | 7033200 | B2 | 3/2022 |
| KR | 10-1431133 | B1 | 8/2014 |
| WO | WO 2008/136641 | A1 | 11/2008 |
| WO | 2012/071632 | A1 | 6/2012 |
| WO | 2012/100149 | A1 | 7/2012 |
| WO | 2013/142469 | A1 | 9/2013 |
| WO | 2014/031996 | A1 | 2/2014 |
| WO | 2016/205057 | A1 | 12/2016 |
| WO | 2019/079531 | A1 | 4/2019 |
| WO | 2019/162649 | A1 | 8/2019 |
| WO | 2019/209542 | A1 | 10/2019 |
| WO | 2022/026399 | A1 | 2/2022 |
| WO | WO 2022/232182 | A1 | 11/2022 |
| WO | 2023/096938 | A1 | 6/2023 |
| WO | 2023/114873 | A1 | 6/2023 |
| WO | 2023/114879 | A1 | 6/2023 |
| WO | 2023/215526 | A1 | 11/2023 |

OTHER PUBLICATIONS

International Preliminary Report on Patentability, re PCT Application No. PCT/US2022/26399, dated Nov. 9, 2023.
International Search Report and Written Opinion, re PCT Application No. PCT/US2022/26399, dated Aug. 11, 2022.
International Search Report and Written Opinion, re PCT Application No. PCT/US2022/50797, dated Mar. 28, 2023.
International Search Report and Written Opinion, re PCT Application No. PCT/US2022/81602, dated Apr. 3, 2023.
European Extended Search Report, re EP Application No. 22796580.3, dated Dec. 19, 2024.
International Search Report and Written Opinion, re PCT Application No. PCT/US2022/081594, mailed Apr. 5, 2023.
International Search Report and Written Opinion, re PCT Application No. PCT/US2023/021077, mailed Jul. 31, 2023.

* cited by examiner

VENTURI DEVICE WITH FORCED INDUCTION

INCORPORATION BY REFERENCE

This application claims priority to International Patent Application No. PCT/IB2021/000237, filed Apr. 27, 2021, which is hereby incorporated by reference in its entirety herein and made part of this disclosure. Related German Application Nos. DE 102019003025.7, filed Apr. 26, 2019, and DE 102019006055.5, filed Sep. 4, 2019, are hereby incorporated by reference in their entireties herein and made part of this disclosure. Any and all applications for which a foreign or domestic priority claim is identified in the Application Data Sheet as filed with the present application are hereby incorporated by reference under 37 CFR 1.57.

FIELD

This disclosure relates to Venturi devices and applications thereof.

BACKGROUND

The demand for energy across a variety of applications has increased dramatically over the past century. Accordingly, harvesting energy from various sources is needed.

SUMMARY

Neither the preceding summary nor the following detailed description purports to limit or define the scope of protection. The scope of protection is defined by the claims.

As the demand for energy increases, the demand to harvest energy from untapped or under-exploited sources has increased as well, especially those sources readily available. Accordingly, various devices and systems are disclosed herein that address one or more of these problems. For example, devices and systems are disclosed herein that incorporate a Venturi device with forced induction to harvest or recirculate energy for consumption.

In some configurations, disclosed herein is a system for converting ambient thermal energy into electrical energy. The system can include a fluid loop that can circulate a primary flow of a fluid. The system can include a pump that can be disposed on the fluid loop. The pump can drive circulation of the primary flow through the fluid loop. The system can include a first Venturi device disposed on the fluid loop and upstream of the pump and a second Venturi device disposed on the fluid loop and downstream of the pump. Each of the first and the second Venturi devices can include an inlet that can receive the primary flow. Each of the first and the second Venturi devices can include an outlet that can eject the primary flow. Each of the first and the second Venturi devices can include a body disposed between the inlet and the outlet. The body can include a converging portion that can increase a velocity of the primary flow and decrease a pressure of the primary flow. The body can include a diverging portion that can decrease the velocity of the primary flow and increase the pressure of the primary flow. The body can include a throat disposed between the converging portion and the diverging portion. The throat can include a diameter that is smaller than a diameter of the converging portion and a diameter of the diverging portion, wherein a movement of the primary flow through the converging portion, throat, and diverging portion can produce a Venturi effect that decreases a temperature of the primary flow upstream of the diverging portion such that thermal energy from an ambient environment outside the body is transferred to the primary flow. The body can include an annular chamber that can receive a secondary flow of the fluid. The body can include an annular passageway disposed downstream of the throat. The annular passageway can encircle the primary flow and direct the secondary flow from the annular chamber into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase downstream of the throat before ejection through the outlet. The system can include a turbine disposed in the fluid loop upstream of the first Venturi device and downstream of the second Venturi device. The turbine can be driven by the primary flow. The system can include a generator that can drive the turbine to generate electrical energy to power the pump from the thermal energy of the ambient environment.

In some configurations, the secondary flow can flow from the turbine to the annular chamber of the first Venturi device and the annular chamber of the second Venturi device.

In some configurations, the system can include a conduit that can be fluidically connected to the turbine and the annular chamber of the first Venturi device and the annular chamber of the second Venturi device. The conduit can recirculate the secondary flow from the primary flow to the annular chambers of the first and the second Venturi devices.

In some configurations, the secondary flow can flow from the pump to the annular chamber of the first Venturi device and the annular chamber of the second Venturi device.

In some configurations, the system can include a conduit that can be fluidically connected to the pump and the annular chamber of the first Venturi device and the annular chamber of the second Venturi device. The conduit can recirculate the secondary flow from the primary flow to the annular chambers of the first and the second Venturi devices.

In some configurations, the system can include a conduit that can be fluidically connected to the fluid loop. The conduit can recirculate the secondary flow from the primary flow to the annular chambers of the first and the second Venturi devices.

In some configurations, a cross-sectional flow area of the annular passageway can be smaller than a cross-sectional flow area of an input from the conduit to the annular chamber.

In some configurations, the pump can include a motor that can be powered by an external power supply until the generator produces sufficient electrical energy to power the motor.

In some configurations, the converging portion can include a cross-sectional flow area that decreases in size in the direction of flow of the primary flow. The converging portion can include a cross-sectional flow area that continuously decreases in size in the direction of flow of the primary flow.

In some configurations, the cross-sectional flow area of the converging portion can be circular.

In some configurations, the converging portion can define a flow area having a conical shape.

In some configurations, the diverging portion can include a cross-sectional flow area that increases in size in the direction of flow of the primary flow. The diverging portion can include a cross-sectional flow area that continuously increases in size in the direction of flow of the primary flow.

In some configurations, the cross-sectional flow area of the diverging portion can be circular.

In some configurations, the size of the cross-sectional flow area of the converging portion can change more rapidly than the size of the cross-sectional flow area of the diverging portion per a unit of length.

In some configurations, the diverging portion can include a flow area that has a conical shape.

In some configurations, a length of the diverging portion can be greater than a length of the converging portion.

In some configurations, the fluid loop can include tubing.

In some configurations, the converging portion can be a first converging portion and the body of each of the first and the second Venturi devices can include a second converging portion disposed between the diverging portion and the annular passageway.

In some configurations, the second converging portion can include a cross-sectional flow area that decreases in size in the direction of flow of the primary flow. The second converging portion can include a cross-sectional flow area that continuously decreases in size in the direction of flow of the primary flow.

In some configurations, the throat can be a junction of the converging portion and the diverging portion. In some configurations, the throat can be a constriction between the converging portion and the diverging portion.

In some configurations, the throat can include a circular cross-sectional flow area.

In some configurations, the annular passageway can be adjustable to regulate an input of the secondary flow into the primary flow.

In some configurations, the annular passageway can be an annular gap.

In some configurations, the annular passageway can be a ring gap.

In some configurations, the annular chamber can distribute the secondary flow throughout the annular chamber.

In some configurations, the annular chamber can include a Coanda surface configured to distribute incoming secondary flow throughout the annular chamber.

In some configurations, the annular passageway can include a Coanda surface.

In some configurations, the system can include one or more conduits fluidically connected to the fluid loop. The one or more conduits can recirculate the secondary flow from the primary flow to the annular chambers of the first and second Venturi devices at multiple connections around each of the annular chambers.

In some configurations, the multiple connections can be circumferentially distributed about each of the annular chambers.

In some configurations, each connection of the multiple connections can be distributed 22.5 degrees away from an adjacent input location of the multiple input location.

In some configurations, the system can be self-amplified by the thermal energy of the ambient environment.

In some configurations, the turbine can be accelerated as more thermal energy of the ambient environment is transferred into the primary flow.

In some configurations, the annular chamber can encircle the primary flow.

In some configurations, the annular passageway can be disposed downstream of the diverging portion.

In some configurations, the first Venturi device can be disposed at a first position on the fluid loop that is between the pump and the turbine. The turbine can be disposed at a second position on the fluid loop that is between the first and the second Venturi devices. The pump can be disposed at a third position on the fluid loop that is between the first and the second Venturi devices.

In some configurations, the annular passageway can be disposed between the diverging portion and the outlet.

In some configurations, disclosed herein is a system for converting ambient thermal energy into electrical energy. The system can include a fluid loop that can circulate a primary flow of a fluid. The system can include a pump disposed on the fluid loop. The pump can drive circulation of the primary flow through the fluid loop. The system can include a first Venturi device disposed on the fluid loop and upstream of the pump and a second Venturi device disposed on the fluid loop and downstream of the pump. Each of the first and the second Venturi devices can include an inlet configured to receive the primary flow. Each of the first and the second Venturi devices can include an outlet configured to eject the primary flow. Each of the first and the second Venturi devices can include a body disposed between the inlet and the outlet. The body can include a converging portion that can increase a velocity of the primary flow and decrease a pressure of the primary flow. The body can include a diverging portion that can decrease the velocity of the primary flow and increase the pressure of the primary flow. A movement of the primary flow through the converging portion and diverging portion can produce a Venturi effect that decreases a temperature of the primary flow upstream of the diverging portion such that thermal energy from an ambient environment outside the body is transferred to the primary flow. The body can include an annular chamber that can receive a secondary flow of the fluid. The body can include an annular passageway that can be disposed downstream of the converging portion. The annular passageway can encircle the primary flow and direct the secondary flow from the annular chamber into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase downstream of the converging portion before ejection through the outlet. The system can include a turbine disposed in the fluid loop upstream of the first Venturi device and downstream of the second Venturi device. The turbine can be driven by the primary flow. The system can include a generator that can be driven by the turbine to generate electrical energy to power the pump from the thermal energy of the ambient environment.

In some configurations, the body can include a throat disposed between the converging portion and the diverging portion. The throat can include a diameter that can be smaller than a diameter of the converging portion and a diameter of the diverging portion.

In some configurations, disclosed herein is a system for converting thermal energy into electrical energy. The system can include a fluid loop that can circulate a primary flow of a fluid. The system can include a pump disposed on the fluid loop. The pump can drive circulation of the primary flow through the fluid loop. The system can include a Venturi device disposed on the fluid loop. The Venturi device can include an inlet that can receive the primary flow of the fluid. The Venturi device can include an outlet that can eject the primary flow. The Venturi device can include a body disposed between the inlet and the outlet. The body can include a converging portion and a diverging portion disposed downstream of the converting portion. A movement of the primary flow through the converging portion and the diverging portion can produce a Venturi effect that can decrease a temperature of the primary flow upstream of the diverging portion such that thermal energy from an ambient environment outside the body is transferred to the primary flow. The boy can include a secondary input disposed downstream of the converging portion. The secondary input can direct a secondary flow of fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase downstream of the converging portion before ejection through the outlet. The system can include a turbine that can be disposed in the fluid loop. The turbine can be driven by the primary flow. The system can include a generator that can be driven by the turbine to generate electrical energy to power the pump.

In some configurations, the secondary input can be an annular passageway.

In some configurations, the secondary input can include one or more apertures.

In some configurations, the secondary input can include a plurality of apertures.

In some configurations, the secondary input can include an annular gap.

In some configurations, the secondary input can include a ring gap.

In some configurations, the secondary input can encircle the primary flow through the body.

In some configurations, the secondary input can circumferentially encircle the primary flow through the body.

In some configurations, the secondary input can include one or more openings that can be circumferentially distributed about a flow path of the primary flow. The secondary input can direct the secondary flow radially inward toward the primary flow.

In some configurations, the body can include a throat disposed between the converging portion and the diverging portion. The throat can include a diameter that is smaller than a diameter of the converging portion and a diameter of the diverging portion.

In some configurations, the body can include an annular chamber that can receive and direct the secondary flow to the secondary input.

In some configurations, the annular chamber can encircle the primary flow through the body.

In some configurations, system can include a conduit fluidically connected to the fluid loop. The conduit can recirculate the secondary flow from the primary flow to the Venturi device.

In some configurations, the system can include a plurality of secondary inputs.

In some configurations, the secondary flow can flow from the turbine to the Venturi device.

In some configurations, the secondary flow can flow from the pump to the Venturi device.

In some configurations, the pump can include a motor that can be powered by an external power supply until the generator produces sufficient electrical energy to power the motor.

In some configurations, the Venturi device can be a first Venturi device and the system can further include a second Venturi device disposed on the fluid loop.

In some configurations, the first Venturi device can be disposed upstream of the pump and downstream of the turbine. The second Venturi device can be disposed downstream of the pump and upstream of the turbine.

In some configurations, the secondary flow can flow to the first and the second Venturi devices.

In some configurations, the secondary flow can flow from the turbine to the first and the second Venturi devices.

In some configurations, the secondary flow can flow from the pump to the first and the second Venturi devices.

In some configurations, the secondary input can be disposed downstream of the diverging portion.

In some configurations, the converging portion can include a cross-sectional flow area that decreases in size in the direction of flow of the primary flow. The converging portion can include a cross-sectional flow area that continuously decreases in size in the direction of flow of the primary flow.

In some configurations, the diverging portion can include a cross-sectional flow area that increases in size in the direction of flow of the primary flow. The diverging portion can include a cross-sectional flow area that continuously increases in size in the direction of flow of the primary flow.

In some configurations, a length of the diverging portion can be greater than a length of the converging portion.

In some configurations, the converging portion can be a first converging portion and the system can further include a second converging portion that can be disposed between the diverging portion and the secondary input.

In some configurations, the second converging portion can include a cross-sectional flow area that decreases in size in the direction of flow of the primary flow. The second converging portion can include a cross-sectional flow area that continuously decreases in size in the direction of flow of the primary flow.

In some configurations, the cross-sectional flow area of the second converging portion can converge to a size that is smaller than a cross-sectional flow area of the first converging portion and a cross-sectional flow area of the diverging portion.

In some configurations, the angle can be ninety degrees.

In some configurations, the angle can be between 60 and 120 degrees.

In some configurations, a cross-sectional flow area of the outlet can be smaller than a cross-sectional flow area of the inlet.

In some configurations, the body can include a throat disposed between the converging portion and the diverging portion. The cross-sectional flow area of the outlet can be smaller than a cross-sectional flow area of the throat.

In some configurations, the converging portion can be configured to increase a velocity of the primary flow and decrease a pressure of the primary flow. The diverging portion can decrease the velocity of the primary flow and increase the pressure of the primary flow.

In some configurations, the annular chamber can include a Coanda surface that can distribute incoming secondary flow throughout the annular chamber.

In some configurations, the secondary input can include a Coanda surface.

In some configurations, a system is disclosed herein for converting thermal energy into electrical energy. The system can include a fluid loop configured to circulate a primary flow of a fluid. The system can include a pump disposed on the fluid loop. The pump can drive circulation of the primary flow through the fluid loop. The system can include a Venturi device disposed on the fluid loop. The Venturi device can include an inlet that can receive the primary flow of the fluid. The Venturi device can include an outlet that can eject the primary flow. The Venturi device can include a body disposed between the inlet and the outlet. The body can include a converging portion and a diverging portion. A movement of the primary flow through the converging portion and the diverging portion can produce a Venturi effect that decreases a temperature of the primary flow through the converging portion such that thermal energy from an ambient environment outside the body is transferred to the primary flow. The body can include a secondary input that can be disposed between the converging portion and the outlet. The secondary input can direct a secondary flow of fluid into the primary flow at an angle relative to a direction of flow of the primary flow to create a vortex for producing a suction at the inlet to suck the primary flow through the inlet and into the body to decrease the temperature of the primary flow through the converging portion such that thermal energy from the ambient environment outside the body is transferred to the primary flow, causing the temperature and the pressure of the primary flow to increase through the diverging portion before ejection through the outlet. The system can include a turbine disposed in the fluid loop. The turbine can be driven by the primary flow. The system can include a generator that can be driven by the turbine to generate electrical energy to power the pump.

In some configurations, a Venturi device is disclosed herein for harvesting thermal energy. The Venturi device can include an inlet that can receive a primary flow of a fluid. The Venturi device can include an outlet that can eject the primary flow. The Venturi device can include a body disposed between the inlet and the outlet. The body can include a converging portion and a diverging portion disposed downstream of the converting portion. A movement of the primary flow through the converging portion and the diverging portion can produce a Venturi effect that decreases a temperature of the primary flow upstream of the diverging portion such that thermal energy from an ambient environment outside the body is transferred to the primary flow. The body can include a secondary input disposed downstream of the converging portion. The secondary input can direct a secondary flow of fluid into the primary flow at an angle relative to a direction of flow of the primary flow to create a vortex for producing a suction at the inlet to suck the primary flow through the inlet and into the body to decrease the temperature of the primary flow upstream of the diverging portion such that thermal energy from the ambient environment outside the body is transferred to the primary flow, causing the temperature and the pressure of the primary flow to increase downstream of the converging portion before ejection through the outlet.

In some configurations, the secondary input can be an annular passageway.

In some configurations, the secondary input can include one or more apertures.

In some configurations, the secondary input can include a plurality of apertures.

In some configurations, the secondary input can include an annular gap.

In some configurations, the secondary input can include a ring gap.

In some configurations, the secondary input can encircle the primary flow through the body.

In some configurations, the secondary input can circumferentially encircle the primary flow through the body.

In some configurations, the secondary input can include one or more openings circumferentially distributed about a flow path of the primary flow. The secondary input can direct the secondary flow radially inward toward the primary flow.

In some configurations, the body can include a throat disposed between the converging portion and the diverging portion. The throat can include a diameter that can be smaller than a diameter of the converging portion and a diameter of the diverging portion.

In some configurations, the body can include an annular chamber that can receive and direct the secondary flow to the secondary input.

In some configurations, the annular chamber can encircle the primary flow in the body.

In some configurations, the annular chamber can include a Coanda surface that can distribute incoming secondary flow throughout the annular chamber.

In some configurations, the secondary input can include a Coanda surface.

In some configurations, the body can include a plurality of secondary inputs.

In some configurations, the secondary input can be disposed downstream of the diverging portion.

In some configurations, the converging portion can include a cross-sectional flow area that decreases in size in the direction of flow of the primary flow. The converging portion can include a cross-sectional flow area that continuously decreases in size in the direction of flow of the primary flow.

In some configurations, the diverging portion can include a cross-sectional flow area that increases in size in the direction of flow of the primary flow. The diverging portion can include a cross-sectional flow area that continuously increases in size in the direction of flow of the primary flow.

In some configurations, a length of the diverging portion can be greater than a length of the converging portion.

In some configurations, the converging portion can be a first converging portion. The body can further include a second converging portion disposed between the diverging portion and the secondary input.

In some configurations, the second converging portion can include a cross-sectional flow area that decreases in size in the direction of flow of the primary flow. The second converging portion can include a cross-sectional flow area that continuously decreases in size in the direction of flow of the primary flow.

In some configurations, the cross-sectional flow area of the second converging portion can converge to a size that is smaller than a cross-sectional flow area of the first converging portion and a cross-sectional flow area of the diverging portion.

In some configurations, the angle can be ninety degrees.

In some configurations, the angle can be between 60 and 120 degrees.

In some configurations, a cross-sectional flow area of the outlet can be smaller than a cross-sectional flow area of the inlet.

In some configurations, the converging portion can increase a velocity of the primary flow and decrease a pressure of the primary flow. The diverging portion can decrease the velocity of the primary flow and increase the pressure of the primary flow.

In some configurations, the cross-sectional flow area of the converging portion can be circular.

In some configurations, the converging portion can define a flow area having a conical shape.

In some configurations, the cross-sectional flow area of the diverging portion can be circular.

In some configurations, the diverging portion can define a flow area that includes a conical shape.

In some configurations, a size of a cross-sectional flow area of the converging portion can change more rapidly than a size of a cross-sectional flow area of the diverging portion per a unit of length.

In some configurations, a length of the diverging portion can be greater than a length of the converging portion. A length of the diverging portion can be greater than a length of the second converging portion. A length of the diverging portion can be greater than a length of the outlet.

In some configurations, a Venturi device is disclosed herein. The Venturi device can include an inlet that can receive a primary flow of a fluid. The Venturi device can include an outlet that can eject the primary flow. The Venturi device can include a body that can be disposed between the inlet and the outlet. The body can include a converging portion and a diverging portion. A movement of the primary flow through the converging portion and the diverging portion can produce a Venturi effect, sucking the primary flow in through the inlet. The body can include a secondary input disposed between the converging portion and the outlet. The secondary input can direct a secondary flow of fluid into the primary flow to create a vortex, sucking the primary flow through the inlet and into the body.

In some configurations, the fluid can be a gas, which can include air.

In some configurations, a supercharger system is disclosed herein for an internal combustion engine. The supercharger system can include a Venturi device. The Venturi device can include an inlet that can receive a primary flow of gas. The Venturi device can include an outlet. The Venturi device can include a body disposed between the inlet and the outlet. The body can include a converging portion and a diverging portion. The converging portion can increase a velocity of the primary flow of gas and decrease a pressure of the primary flow of gas. The diverging portion can decrease the velocity of the primary flow of gas and increase the pressure of the primary flow of gas. The body can include an annular chamber that can receive a secondary flow of an exhaust gas from the internal combustion engine. The body can include a secondary input that can encircle the primary flow and direct the secondary flow from the annular chamber radially inward into the primary flow of gas at a position downstream of the converging portion to create a vortex configured to produce a suction at the inlet to suck the primary flow through the inlet and into the body and to mix the primary flow and the secondary flow together before flowing through the outlet to the internal combustion engine.

In some configurations, the body can include a throat disposed between the converging portion and the diverging portion. The throat can include a diameter that can be smaller than a diameter of the converging portion and a diameter of the diverging portion.

In some configurations, the supercharger system can include a buffer element that can provide the secondary flow to the Venturi device at a consistent operating pressure range. The supercharger system can include a buffer element that can provide the secondary flow to the Venturi device at a consistent pressure.

In some configurations, the buffer element can include an exhaust manifold, a conduit from the exhaust manifold to the annular chamber, a check valve disposed along the conduit, an exhaust outlet conduit configured to direct the exhaust gas to an ambient environment, and a butterfly valve disposed along the exhaust outlet conduit.

In some configurations, the butterfly valve can open when a pressure of the secondary flow in the conduit exceeds a threshold and close when the pressure of the secondary flow in the conduit falls below the threshold. The exhaust gas can flow out of the exhaust outlet conduit and into the ambient environment with the butterfly valve open and the flow of exhaust gas out of the exhaust conduit can be impeded with the butterfly valve closed to increase a pressure of the secondary flow within the conduit.

In some configurations, the supercharger system can include an exhaust manifold, a conduit from the exhaust manifold to the annular chamber, a check valve disposed along the conduit, an exhaust outlet conduit that can direct the exhaust gas from the exhaust manifold to an ambient environment, and a butterfly valve disposed along the exhaust outlet conduit.

In some configurations, the butterfly valve can open when a pressure of the secondary flow in the conduit exceeds a threshold and close when the pressure of the secondary flow in the conduit falls below the threshold. The exhaust gas can flow out of the exhaust conduit and into the ambient environment with the butterfly valve open and the flow of exhaust gas out of the exhaust conduit can be impeded with the butterfly valve closed to increase pressure of the secondary flow within the conduit.

In some configurations, the check valve can be a Tesla one way check valve.

In some configurations, the check valve can be a valvular conduit.

In some configurations, the check valve can be a fixed-geometry passive check valve.

In some configurations, the check valve can include a main channel and a series of loops oriented to facilitate flow of the secondary flow towards the Venturi device and resist flow away from the Venturi device.

In some configurations, a cross-sectional flow area of the secondary input can be smaller than a cross-sectional flow area of an input from the conduit to the annular chamber.

In some configurations, the secondary input can be an annular passageway.

In some configurations, the secondary input can include one or more apertures.

In some configurations, the secondary input can include a plurality of apertures.

In some configurations, the secondary input can include an annular gap.

In some configurations, the secondary input can include a ring gap.

In some configurations, the secondary input can encircle the primary flow through the body.

In some configurations, the secondary input can circumferentially encircle the primary flow through the body.

In some configurations, the secondary input can include one or more openings circumferentially distributed about a flow path of the primary flow. The secondary input can direct the secondary flow radially inward toward the primary flow.

In some configurations, the annular chamber can encircle the primary flow through the body.

In some configurations, the body can include a plurality of secondary inputs.

In some configurations, the converging portion can include a cross-sectional flow area that decreases in size in the direction of flow of the primary flow. The converging portion can include a cross-sectional flow area that continuously decreases in size in the direction of flow of the primary flow.

In some configurations, the diverging portion can include a cross-sectional flow area that increases in size in the direction of flow of the primary flow. The diverging portion can include a cross-sectional flow area that continuously increases in size in the direction of flow of the primary flow.

In some configurations, a length of the diverging portion can be greater than a length of the converging portion.

In some configurations, the converging portion can be a first converging portion and the body can further include a second converging portion disposed between the diverging portion and the secondary input.

In some configurations, the second converging portion can include a cross-sectional flow area that decreases in size in the direction of flow of the primary flow. The second converging portion can include a cross-sectional flow area that continuously decreases in size in the direction of flow of the primary flow.

In some configurations, the cross-sectional flow area of the second converging portion can converge to a size that is smaller than a cross-sectional flow area of the first converging portion and a cross-sectional flow area of the diverging portion.

In some configurations, the secondary input can direct the secondary flow into the primary flow at an angle relative to a direction of flow of the primary flow.

In some configurations, the angle can be ninety degrees.

In some configurations, the angle can be between 60 and 120 degrees.

In some configurations, a cross-sectional flow area of the outlet can be smaller than a cross-sectional flow area of the inlet.

In some configurations, the annular chamber can include a Coanda surface that can distribute incoming secondary flow throughout the annular chamber.

In some configurations, the secondary input can include a Coanda surface.

In some configurations, a supercharger system is disclosed herein for an internal combustion engine. The supercharger system can include a Venturi device. The Venturi device can include an inlet that can receive a primary flow of gas. The Venturi device can include an outlet. The Venturi device can include a body disposed between the inlet and the outlet. The body can include a converging portion and a diverging portion. The converging portion can increase a velocity of the primary flow of gas and decrease a pressure of the primary flow of gas. The diverging portion can decrease the velocity of the primary flow of gas and increase the pressure of the primary flow of gas. The body can include an annular chamber that can receive a secondary flow of an exhaust gas from the internal combustion engine. The body can include a secondary input that can encircle the primary flow and direct the secondary flow from the annular chamber radially inward into the primary flow of gas between the converging portion and the outlet to create a vortex that can produce a suction at the inlet to suck the primary flow through the inlet and into the body and to mix the primary flow and the secondary flow together before flowing through the outlet to the internal combustion engine.

In some configurations, the primary flow can include air from the ambient environment.

In some configurations, the primary flow can include exhaust gas from the internal combustion engine.

In some configurations, the outlet can be fluidically connected with an air intake of the internal combustion engine.

In some configurations, the outlet can be fluidically connected with a combustion chamber of the internal combustion engine.

In some configurations, the inlet can be fluidically connected to an exhaust.

In some configurations, the gas of the primary flow and the exhaust gas of the secondary flow can be fused in the body.

In some configurations, the gas of the primary flow and the exhaust gas of the secondary flow can be compressed between the converging portion and the outlet.

In some configurations, a size of the inlet can be adjustable.

In some configurations, the size of the inlet can be adjusted based on a driving speed of a vehicle incorporating the super charger system or an intake pressure at the inlet.

In some configurations, the inlet can be open in a front-facing direction of a vehicle incorporating the super charger system.

In some configurations, the inlet can include a velocity stack.

In some configurations, the inlet can include a trumpet shape.

In some configurations, the inlet can include an air horn shape.

In some configurations, the inlet can include an inner periphery that decreases in size in a direction of flow of the primary flow. The inlet can include an inner periphery that continuously decreases in size in a direction of flow of the primary flow.

In some configurations, a Venturi device is disclosed herein for a supercharger for an internal combustion engine. The Venturi device can include an inlet that can receive a primary flow of gas. The Venturi device can include an outlet. The Venturi device can include a body disposed between the inlet and the outlet. The body can include a converging portion and a diverging portion. The converging portion can increase a velocity of the primary flow and decrease a pressure of the primary flow. The diverging portion can decrease the velocity of the primary flow and increase the pressure of the primary flow. The body can include an annular chamber that can receive a secondary flow of exhaust gas from the internal combustion engine. The body can include a secondary input that can encircle the primary flow and direct the secondary flow from the annular chamber into the primary flow, between the converging portion and the outlet, at an angle relative to a direction of flow of the primary flow to create a vortex configured to produce a suction at the inlet to suck the primary flow through the inlet and into the body to mix the primary flow and secondary flow together before flowing to the internal combustion engine.

In some configurations, the primary flow of gas can include ambient air.

In some configurations, the primary flow of gas can include exhaust gas from the internal combustion engine. The primary flow of gas can include exhaust fuel.

In some configurations, the body can include a throat disposed between the converging portion and the diverging portion. The throat can include a diameter that is smaller than a diameter of the converging portion and a diameter of the diverging portion.

In some configurations, the secondary input can be an annular passageway.

In some configurations, the secondary input can include one or more apertures.

In some configurations, the secondary input can include a plurality of apertures.

In some configurations, the secondary input can include an annular gap.

In some configurations, the secondary input can include a ring gap.

In some configurations, the secondary input can encircle the primary flow through the body.

In some configurations, the secondary input can circumferentially encircle the primary flow through the body.

In some configurations, the secondary input can include one or more openings that can be circumferentially distributed about a flow path of the primary flow. The secondary input can direct the secondary flow radially inward toward the primary flow.

In some configurations, the annular chamber can encircle the primary flow through the body.

In some configurations, the body can include a plurality of secondary inputs.

In some configurations, the converging portion can include a cross-sectional flow area that decreases in size in the direction of flow of the primary flow. The converging portion can include a cross-sectional flow area that continuously decreases in size in the direction of flow of the primary flow.

In some configurations, the diverging portion can include a cross-sectional flow area that increases in size in the direction of flow of the primary flow. The diverging portion can include a cross-sectional flow area that continuously increases in size in the direction of flow of the primary flow.

In some configurations, a length of the diverging portion can be greater than a length of the converging portion.

In some configurations, the converging portion can be a first converging portion and the body can further include a second converging portion disposed between the diverging portion and the secondary input.

In some configurations, the second converging portion comprises a cross-sectional flow area that decreases in size in the direction of flow of the primary flow. The second converging portion can include a cross-sectional flow area that continuously decreases in size in the direction of flow of the primary flow.

In some configurations, the cross-sectional flow area of the second converging portion converges to a size that is smaller than a cross-sectional flow area of the first converging portion and a cross-sectional flow area of the diverging portion.

In some configurations, the angle can be ninety degrees.

In some configurations, the angle can be between 60 and 120 degrees.

In some configurations, a cross-sectional flow area of the outlet can be smaller than a cross-sectional flow area of the inlet.

In some configurations, the annular chamber can include a Coanda surface that can distribute incoming secondary flow throughout the annular chamber.

In some configurations, the secondary input can include a Coanda surface.

In some configurations, a reduction angle of the second converging portion can be between 35 and 55 degrees.

In some configurations, the outlet can include a cross-sectional flow area that increases in size in a direction of flow of the primary flow. The outlet can include a cross-sectional flow area that continuously increases in size in a direction of flow of the primary flow.

In some configurations, a reduction angle of the outlet can be between 55 and 65 degrees.

In some configurations, a reduction angle of the diverging portion can be between 30 and 53 degrees.

In some configurations, a reduction angle of the converging portion can be between 33 and 41 degrees.

In some configurations, the annular passageway can include a Coanda profile between 40 and 70 degrees.

In some configurations, the secondary input can include a Coanda profile between 40 and 70 degrees.

In some configurations, the butterfly valve can be a pressure activated heat riser butterfly valve.

In some configurations, the inlet can include an elastic polymer that can adjust an opening of the inlet based on an intake pressure of the primary flow.

In some configurations, the inlet can include a programmable metallic polymer that can adjust an opening of the inlet based on an intake pressure of the primary flow.

In some configurations, the annular chamber can include a convex surface.

In some configurations, the convex surface can facilitate distribution of the secondary flow throughout the annular chamber.

In some configurations, the secondary input can include a convex surface.

In some configurations, the annular passageway can include a convex surface.

In some configurations, the convex surface can facilitate distribution of the secondary flow throughout the annular chamber.

In some configurations, the movement of the primary flow through the converging portion decreases a temperature of the primary flow through the converging portion such that thermal energy from an ambient environment outside the body is transferred to the primary flow, causing the temperature and the pressure of the primary flow to increase through the diverging portion before ejection through the outlet.

In some configurations, the secondary input can be configured to direct the secondary flow of fluid into the primary flow at an angle relative to a direction of flow of the primary flow to create the vortex.

In some configurations, the body can include a check valve.

In some configurations, the check valve can facilitate flow of the primary flow from the inlet to the outlet and impedes the primary flow from flowing out of the body by way of the inlet.

In some configurations, the check valve can facilitate the flow of the primary flow from the inlet to the outlet and resist the primary flow from flowing out of the body by way of the inlet.

In some configurations, the check valve can be a one-way check valve.

In some configurations, the check valve can be a valvular conduit.

In some configurations, the check valve can be a fixed-geometry passive check valve.

In some configurations, the check valve can include a main channel and a series of loops oriented to facilitate flow of the secondary flow towards the Venturi device and resist flow away from the Venturi device.

In some configurations, the check valve can be disposed in the converging portion.

In some configurations, the check valve can be disposed between the converging portion and the diverging portion.

In some configurations, the check valve can be disposed in the diverging portion.

In some configurations, the check valve can be disposed at the throat.

In some configurations, the check valve can be disposed between the diverging portion and the second converging portion.

In some configurations, the check valve can be disposed between the second converging portion and the outlet.

In some configurations, the check valve can be disposed at the outlet.

In some configurations, the check valve can be disposed at the inlet.

In some configurations, the check valve can be a Tesla valve.

Methods of using the foregoing system(s) (including device(s), apparatus(es), assembly(ies), structure(s) or the like) are included; the methods of use can include using or assembling any one or more of the features disclosed herein to achieve functions and/or features of the system(s) as discussed in this disclosure. Methods of manufacturing the foregoing system(s) are included; the methods of manufacture can include providing, making, connecting, assembling, and/or installing any one or more of the features of the system(s) disclosed herein to achieve functions and/or features of the system(s) as discussed in this disclosure.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure. In the drawings, similar elements may have reference numerals with the same last two digits.

DETAILED DESCRIPTION

Figure 1:
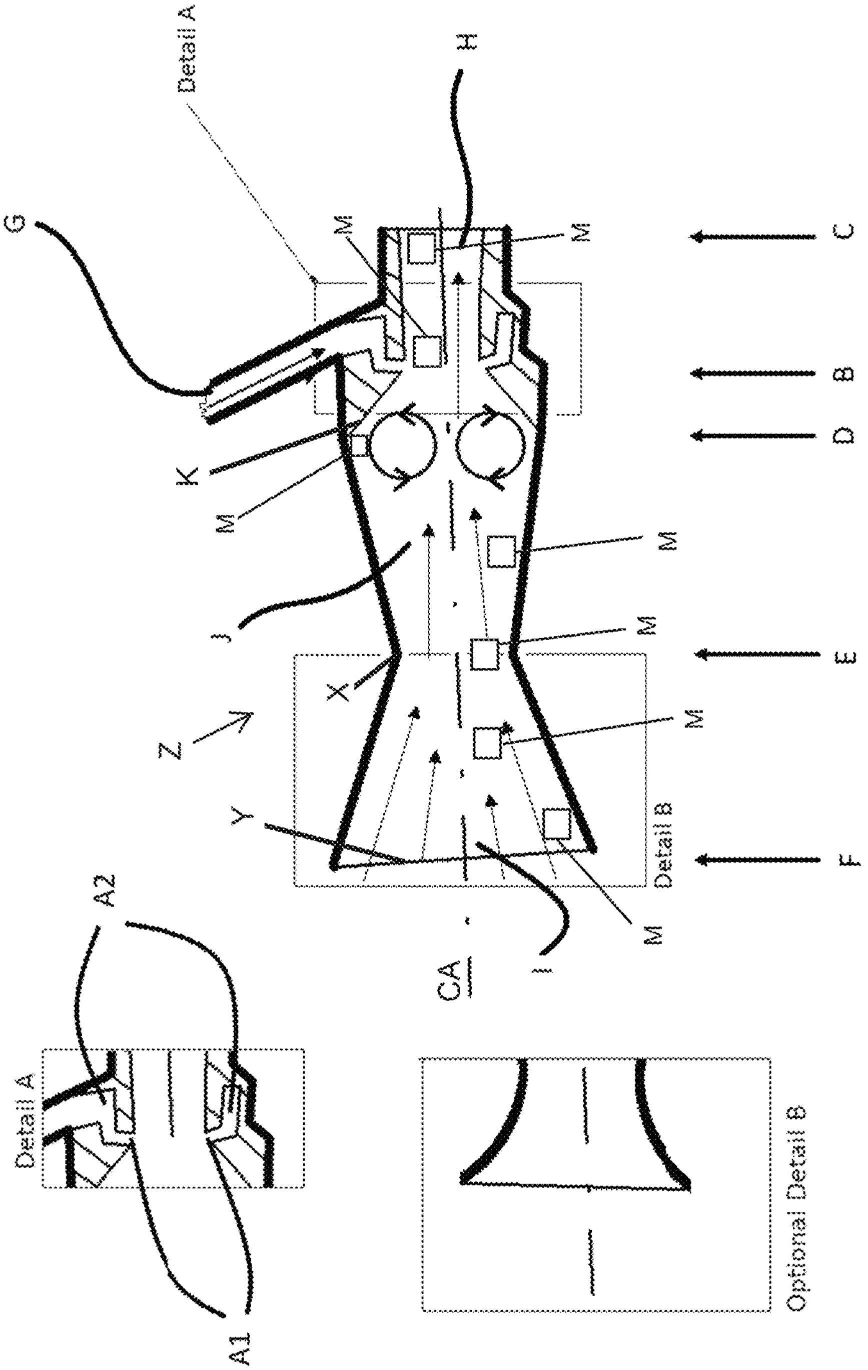
FIG. 1 illustrates a section view of an example Venturi device.

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below. Furthermore, this disclosure describes many embodiments in reference to power generation or supercharging an internal combustion engine but any embodiment and modifications or equivalents thereof should not be limited to the foregoing.

According to the 1st Theorem of Thermodynamics, energy can neither be generated nor consumed. It can only be transformed in its form, that is, from one form of energy into another form. For this reason, the total energy in a closed system remains constant.

There are differences in valence between the forms of energy. Thus, as a possible form of energy, heat can never flow without action, that is to say, from a body of lesser temperature to a body of higher temperature, although the total amount of energy stored in the bodies in the form of heat may be equal. In the opposite direction, this is quite possible and inevitable, that is, the transition of heat from the warmer to the colder body takes place spontaneously and automatically (2nd Theorem of Thermodynamics). The heat in the warmer body is thus of higher value than the heat in the colder body. This heat can at least be partially converted into mechanical energy in heat engines, in which this automatic flow of heat from the warmer body to the colder body is exploited. The proportion of the mechanical energy which can be obtained can be shown by way of a ratio of the two temperatures according to the formula below.

$$\text{Anteil}_{Mech} = \frac{T_{warm} - T_{cold}}{T_{warm}}$$

This proportion can be referred to as the efficiency of the Carnot process.

As disclosed herein, thermal energy can be converted into mechanical energy by suctioning mechanisms. Described herein are systems and devices for converting low-grade thermal energy (e.g., ambient temperature) into high-quality energy (electricity). For example, Venturi devices are described herein that form one or more flow-induced vortices within a fluid (e.g., air, water, gas, etc.) flowing through the Venturi devices. The one or more vortices can occur at a location within the Venturi device where a secondary fluid flow merges (e.g., mixes, fuses) with a primary fluid flow through the Venturi device. The one or more vortices can form a suction, sucking the primary flow into the Venturi device through an inlet. In some configurations, the suction and the Venturi effect, created by the flow of fluid through the Venturi device, can lower a temperature of the primary flow through at least a portion of the Venturi device, causing thermal energy in an ambient environment outside the Venturi device to be transferred to the primary flow (e.g., charging the primary flow). In some configurations, the secondary fluid flow can include exhaust gas from an internal combustion engine, which can be mixed (e.g., fused) into the primary flow to charge the primary flow. Accordingly, the Venturi devices described herein can be referred to as a "vortex fusion charger."

Venturi Device with Forced Induction

FIG. 1 illustrates a section view of an example Venturi device (Z), which can also be referred to as a vortex fusion charger or VFC. The Venturi device (Z) can, in some configurations, include a rotationally symmetrical inner periphery, which can include rotational symmetry about the central axis CA. The Venturi device (Z) can be a tubular structure. The inner periphery of the Venturi device (Z) can define primary flow path, which can be an inner region, cavity, lumen, etc., that receives a primary flow of a fluid (e.g., water, gas, air, exhaust gases, etc.). In some configurations, the inner periphery of the Venturi device (Z) can be a circular shape. In some variations, the inner periphery may be other shapes, such as an oval, polygon, irregular, and/or others. The inner periphery may define a flow path for the primary flow of the fluid in the direction of the arrows in FIG. 1. The inner periphery of the Venturi device (Z) can define cross-sectional flow areas for the primary flow of fluid, which can be circular. The inner periphery can change such that the cross-sectional flow areas change in size and/or shape along a length of the Venturi device (Z). For example, the inner periphery of the Venturi device (Z) can include an inner diameter that assumes different sizes along its length or central axis CA.

The primary flow of fluid can enter the Venturi device (Z) through the inlet (Y). The inlet (Y) can be connected to a conduit (e.g., tube) that can circulate the primary flow. In some variants, the inlet (Y) can be open to the ambient air. An inner periphery of the inlet (Y) can be circular. In some variants, the inner periphery of the inlet (Y) can be oval, polygonal, irregular, and/or others. The inlet (Y) can, as shown in Detail B, include a velocity stack, trumpet shape, and/or air horn shape. The inlet (Y) can include an inner periphery that converges. The inlet (Y) can include cross-sectional flow area that converges. The inlet (Y) can include an inner periphery that decreases in size in the direction of flow of the primary flow. The inlet (Y) can include an inner periphery that continuously decreases in size in the direction of flow of the primary flow. The inlet (Y) can include cross-sectional flow areas that that decrease in size in the direction of flow of the primary flow. The inlet (Y) can include cross-sectional flow areas that continuously decreases in size in the direction of flow of the primary flow. The inlet (Y) can include a curved peripheral wall, as shown in Detail B. The inner periphery of the inlet (Y) can converge. The inlet (Y) can increase the velocity of the primary flow through the inlet (Y), decreasing a pressure of the primary flow.

The primary flow of fluid can exit the Venturi device (Z) through the outlet (H). The outlet (H) can be disposed on an opposing side of the Venturi device (Z) as the inlet (Y). The outlet (H) can be connected to a conduit (e.g., tube) that can circulate the primary flow. In some variants, the outlet (H) can be connected to an engine, as described herein, to facilitate supercharging the engine with compressed gases. An inner periphery of the outlet (H) can be circular. In some variants, the inner periphery of the outlet (H) can be oval, polygonal, irregular, and/or others. The inner periphery of the outlet (H) can diverge. A cross-sectional flow area of the outlet (H) can diverge in the direction of flow of the primary flow. The inner periphery of the outlet (H) can increase in size in the direction of flow of the primary flow. The inner periphery of the outlet (H) can continuously increase in size in the direction of flow of the primary flow. The outlet (H) can include cross-sectional flow areas that that increase in size in the direction of flow of the primary flow. The outlet (H) can include cross-sectional flow areas that continuously increase in size in the direction of flow of the primary flow. The inner periphery of the outlet (H) can diverge. The outlet (H) can decrease the velocity of the primary flow through the outlet (H), increasing a pressure of the primary flow.

The Venturi device (Z) can include a body (e.g., tubular body) between the inlet (Y) and the outlet (H). The primary flow path can flow through the body between the inlet (Y) and the outlet (H). The body can include a converging portion (I). The converging portion (I) can increase the velocity of the primary fluid flowing through the converging portion (I). The converging portion (I) can decrease the pressure of the primary fluid flowing through the converging portion (I). An inner periphery of the converging portion (I) can be circular. In some variants, the inner periphery of the converging portion (I) can be oval, polygonal, irregular, and/or others. The converging portion (I) can include an inner periphery that converges. The converging portion (I) can include a cross-sectional flow area that converges. The converging portion (I) can include an inner periphery that decreases in size in the direction of flow of the primary flow. The converging portion (I) can include an inner periphery that continuously decreases in size in the direction of flow of the primary flow. The converging portion (I) can include cross-sectional flow areas that that decrease in size in the direction of flow of the primary flow. The converging portion (I) can include cross-sectional flow areas that continuously decreases in size in the direction of flow of the primary flow. The converging portion (I) can include a flow area having the shape of a cone. The cross-sectional flow area of the converging portion (I) can decrease at a consistent rate. A temperature of the primary flow flowing through the converging portion (I) can decrease as a result of the increased velocity and decreased pressure.

The body of the Venturi device (Z) can include a throat (X), which can also be referred to as a constriction. The throat (X) can be disposed between the converging portion (I) and a diverging portion (J). The throat (X) can include an inner periphery that is smaller than that of the converging portion (I) and the diverging portion (J). For example, the throat (X) can include a diameter that is smaller than a diameter of the converging portion (I) and the diverging portion (J). The throat (X) can include a cross-sectional flow area that is smaller than that of the converging portion (I) and the diverging portion (J). In some configurations, the throat (X) can be the junction of the converging portion (I) and the diverging portion (J). In some configurations, the throat (X) includes a length. In some configurations, the inner periphery of the throat (X) is an inflection point between the converging portion (I) and the diverging portion (J). In some variants, the converging portion (I) converges to the throat (x) and immediately diverges to the diverging portion (J).

The body of the Venturi device (Z) can include a diverging portion (J). The diverging portion (J) can be downstream of the inlet (Y) and converging portion (I). The diverging portion (J) can be downstream of the throat (X). The diverging portion (J) can be disposed between the converging portion (I) and the outlet (H), second converging portion (K), and/or secondary input (A1). The diverging portion (J) can decrease the velocity of the primary fluid flowing through the diverging portion (J). The diverging portion (J) can increase the pressure of the primary fluid flowing through the diverging portion (J). An inner periphery of the diverging portion (J) can be circular. In some variants, the inner periphery of the diverging portion (J) can be oval, polygonal, irregular, and/or others. The diverging portion (J) can include an inner periphery that diverges. The diverging portion (J) can include a cross-sectional flow area that diverges. The diverging portion (J) can include an inner periphery that increases in size in the direction of flow of the primary flow. The diverging portion (J) can include an inner periphery that continuously increases in size in the direction of flow of the primary flow. The diverging portion (J) can include cross-sectional flow areas that that increase in size in the direction of flow of the primary flow. The diverging portion (J) can include cross-sectional flow areas that continuously increases in size in the direction of flow of the primary flow. The diverging portion (J) can include a flow area having the shape of a cone. The cross-sectional flow area of the diverging portion (J) can decrease at a consistent rate. The diverging portion (J) can be longer than the converging portion (I). The size of the cross-sectional flow area of the converging portion (I) can change more rapidly than the size of the cross-sectional flow area of the diverging portion (J) per a unit of length. The angle of the periphery of the converging portion (I) relative to the central axis CA and/or direction of flow of the primary flow can be larger than the angle of the periphery of the diverging portion (J) relative to the central axis CA and/or direction of flow of the primary flow.

The flow of the primary flow through the converging portion (I), throat (X), and/or diverging portion (J) can produce a Venturi effect, which can create a suction at the inlet (Y). The flow of the primary flow through the converging portion (I) and throat (X) can produce a Venturi effect, which can create a suction at the inlet (Y). The flow of the primary flow through the converging portion (I) can produce a Venturi effect, which can create a suction at the inlet (Y). The increase in the velocity and decrease in pressure of the primary flow through the converging portion (I) and/or throat (X) can decrease a temperature of the primary flow such that thermal energy (e.g., heat) from the ambient environment outside the body of the Venturi device (Z) is transferred to the primary flow. In some variants, the body of the Venturi device (Z) or at least the converging portion (I) and/or throat (X) can include a conductive material (such as a metal) to facilitate efficient transfer of thermal energy through the body.

The body of the Venturi device (Z) can include a second converging portion (K). The second converging portion (K) can be downstream of the inlet (Y), converging portion (I), throat (X), and diverging portion (J). The second converging portion (K) can be disposed between the diverging portion (J) and the secondary input (A1) and the outlet (H). The second converging portion (K) can increase the velocity of the primary flow flowing through the second converging portion (K). The second converging portion (K) can decrease the pressure of the primary fluid flowing through the second converging portion (K). An inner periphery of the second converging portion (K) can be circular. In some variants, the inner periphery of the second converging portion (K) can be oval, polygonal, irregular, and/or others. The second converging portion (K) can include an inner periphery that converges. The second converging portion (K) can include a cross-sectional flow area that converges. The second converging portion (K) can include an inner periphery that decreases in size in the direction of flow of the primary flow. The second converging portion (K) can include an inner periphery that continuously decreases in size in the direction of flow of the primary flow. The second converging portion (K) can include cross-sectional flow areas that that decrease in size in the direction of flow of the primary flow. The second converging portion (K) can include cross-sectional flow areas that continuously decreases in size in the direction of flow of the primary flow. The second converging portion (K) can include a flow area having the shape of a cone. The cross-sectional flow area of the second converging portion (K), converging portion (I), and/or diverging portion (J) can change at a consistent rate per unit of length. The angle of the periphery of the converging portion (K) relative to the central axis CA and/or direction of flow of the primary flow can be larger than the angle of the peripheries of the diverging portion (J), converging portion (I), and/or outlet (H) relative to the central axis CA and/or direction of flow of the primary flow.

A conduit (G), which can also be referred to as a tube, conduit, chamber, lumen, or the like, can circulate a secondary flow of a fluid (e.g., water, gas, air, exhaust gases, etc.) to the Venturi device (Z). As described herein, the conduit (G) can recirculate a portion of the primary flow as a secondary flow into the primary flow. The conduit (G) can be connected to an annular chamber (A2) of the body of the Venturi device (Z) to direct the secondary flow to the annular chamber (A2). In some configurations, multiple conduits (G) can connected to the annular chamber (A2) at multiple locations to direct the secondary flow into the annular chamber (A2).

The body of the Venturi device (Z) can include an annular chamber (A2). The annular chamber (A2) can be ring shaped. In some configurations, the annular chamber (A2) can be torus shaped. The annular chamber (A2) can encircle the primary flow of fluid. The annular chamber (A2) can encircle the central axis CA of the Venturi device (Z). The annular chamber (A2) can circumferentially surround the primary flow of fluid. The secondary flow of fluid can spread throughout the annular chamber (A2). A surface of the annular chamber (A2) can include a Coanda surface or profile that can facilitate the secondary flow of fluid spreading throughout the annular chamber (A2). A surface of the annular chamber (A2) can be convex to facilitate the secondary flow of fluid spreading throughout the annular chamber (A2). The secondary flow can adhere (e.g., molecular adhesion) to the surface(s) of the annular chamber (A2) to spread throughout the annular chamber (A2).

The body of the Venturi device (Z) can include a secondary input (A1). The secondary input (A1) can be disposed downstream of the inlet (Y), converging portion (I), throat (X), diverging portion (J), and/or second converging portion (K). The secondary input (A1) can be disposed between the converging portion (I), throat (X), diverging portion (J), and/or second converging portion (K) and the outlet (H). The secondary input (A1) can include one or more flow paths from the annular chamber (A2) into the primary flow and/or inner region and/or primary flow path of the Venturi device (Z) through which the primary flow travels. The secondary input (A1) can be an annular passageway, one or more apertures, plurality of apertures, one or more slots, annular gap, and/or ring gap. The secondary input (A1) can encircle the primary flow through the body of the Venturi device (Z). The secondary input (A1) can circumferentially encircle the primary flow through the body. The secondary input (A1) can include one or more openings circumferentially distributed about a flow path of the primary flow. The secondary input (A1) can define an annular shaped opening in an inner periphery of the body of the Venturi device (Z). The secondary input (A1) can direct the secondary flow into the primary flow at an angle relative to the direction of flow of the primary flow and/or relative to the central axis CA of the body of the Venturi device (Z). The angle can, in some variants, be ninety degrees. The angle can, in some configurations, be between sixty and one hundred and twenty degrees. The secondary input (A1) can direct the secondary flow, at least partially, against the direction of flow of the primary flow. The introduction of the secondary flow by way of the secondary input (A1) into the primary flow can create a vortex, swirl(s), one or more vortices, and/or the like in the primary flow. The creation of the vortex can create a suction at the inlet (Y) sucking the primary flow into the Venturi device (Z) through the inlet (Y). The suction of the primary flow into the Venturi device (Z) can cause the velocity to increase and pressure to decrease of the primary flow through the converging portion (I) and throat (X), which can cause the temperature of the primary flow through the converging portion (I) and/or throat (X) to decrease such that thermal energy (e.g., heat) from the ambient environment outside the body of the Venturi device (Z) is transferred to the primary flow through the body, charging the primary flow with the thermal energy. The temperature and pressure of the primary flow downstream of the throat (X) (e.g., in the diverging portion (J)) can increase before exiting through the outlet (H). An opening of the secondary input (A1) into the inner region of the body (e.g., the primary flow path) can be smaller than a cross-sectional flow area of an input from the conduit (G) into the annular chamber (A2). The secondary input (A1) can direct the secondary flow radially inward toward the primary flow of fluid and/or the central axis CA of the body.

In some configurations, the body can include a check valve (M). The check valve (M) can facilitate flow of the primary flow from the inlet (Y) to the outlet (H) and impede and/or resist the primary flow from flowing out of the body by way of the inlet (Y). In some configurations, the check valve (M) can be a one-way check valve. In some configurations, the check valve (M) can be a valvular conduit. In some configurations, the check valve (M) can be a fixed-geometry passive check valve (M). In some configurations, the check valve (M) can include a main channel and a series of loops oriented to facilitate flow of the secondary flow towards the Venturi device and resist flow away from the Venturi device. In some configurations, the check valve (M) can be a Tesla valve. In some configurations, the check valve (M) can be disposed in the converging portion (I). In some configurations, the check valve (M) can be disposed between the converging portion (I) and the diverging portion (J). In some configurations, the check valve (M) can be disposed in the diverging portion (J). In some configurations, the check valve (M) can be disposed at the throat (X). In some configurations, the check valve (M) can be disposed between the diverging portion (J) and the second converging portion (K). In some configurations, the check valve (M) can be disposed between the second converging portion (K) and the outlet (H). In some configurations, the check valve (M) can be disposed at the outlet (H). In some configurations, the check valve (M) can be disposed at the inlet.

As described herein, the Venturi device (Z) can include three openings at the locations (G), (H) and (I). In some variants, these three openings can be open to the environment. The annular chamber (A2) can be connected via the annular gap (A1) with the inner region (e.g., primary flow path) of the Venturi device (Z). The inner region of the body can taper at position (E), thus having a smaller inner diameter than at positions (F) and (D). The taper (reduction of the inner diameter) from position (F) to position (E) as well as the extension (enlargement of the inner diameter) from position (E) to position (D) can be continuous, such as conical. When a secondary flow is introduced into the opening (G), the secondary flow flows into the annular chamber (A2) and is distributed radially there in the annular chamber, which can include an entirety of the annular chamber. From the annular chamber (A2), the secondary flow flows via the secondary input (A1) into the inner region of the body of the Venturi device (Z) and generates there a vortex, which generates a suction effect at the inlet (Y). As a result, the primary flow is sucked in through the inlet (Y) and ejected toward the outlet (H). At position (E) (e.g., throat or constriction (X)), according to the Venturi effect, the flow velocity of the sucked air increases. By combining the effects of the suction and Venturi effect, there can be a reduction in the temperature before the vortex, so that heat from the environment can be absorbed by the primary flow, charging the primary flow with energy from the ambient environment.

In some configurations, a rotationally symmetrical design for the Venturi device (Z) may not be used and no Venturi effect produced. In some configurations, a body may be used that creates a flow-induced formation of a vortex, with a suction on one side of the vortex and an ejection of a flowable medium surrounding the vortex on the other side of the vortex. The flowable medium sucked in during the sucking process can be cooled. The cooled flowable medium sucked in can absorb heat (e.g., thermal energy) from the environment, for example, and thus the internal energy of the flowable medium increases. The guidance of the free-flowing medium via heat exchangers may be used.

System for Converting Ambient Thermal Energy into Electrical Energy

Figure 2:
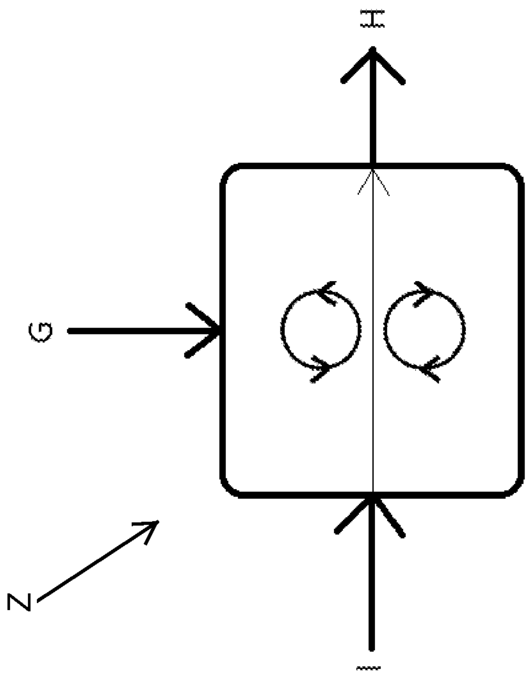
FIG. 2 illustrates a simplified schematic of the Venturi device illustrated in FIG. 1.

For ease, FIG. 2 illustrates a simplified schematic of the Venturi device (Z) of FIG. 1. The letters (G), (H) and (I) in FIG. 2 correspond to the openings at locations (G), (H) and (I) in FIG. 1. Stated differently, (I) corresponds with the inlet (Y), conduit (G) corresponds with (G), and (H) corresponds with outlet (H).

Figure 3:
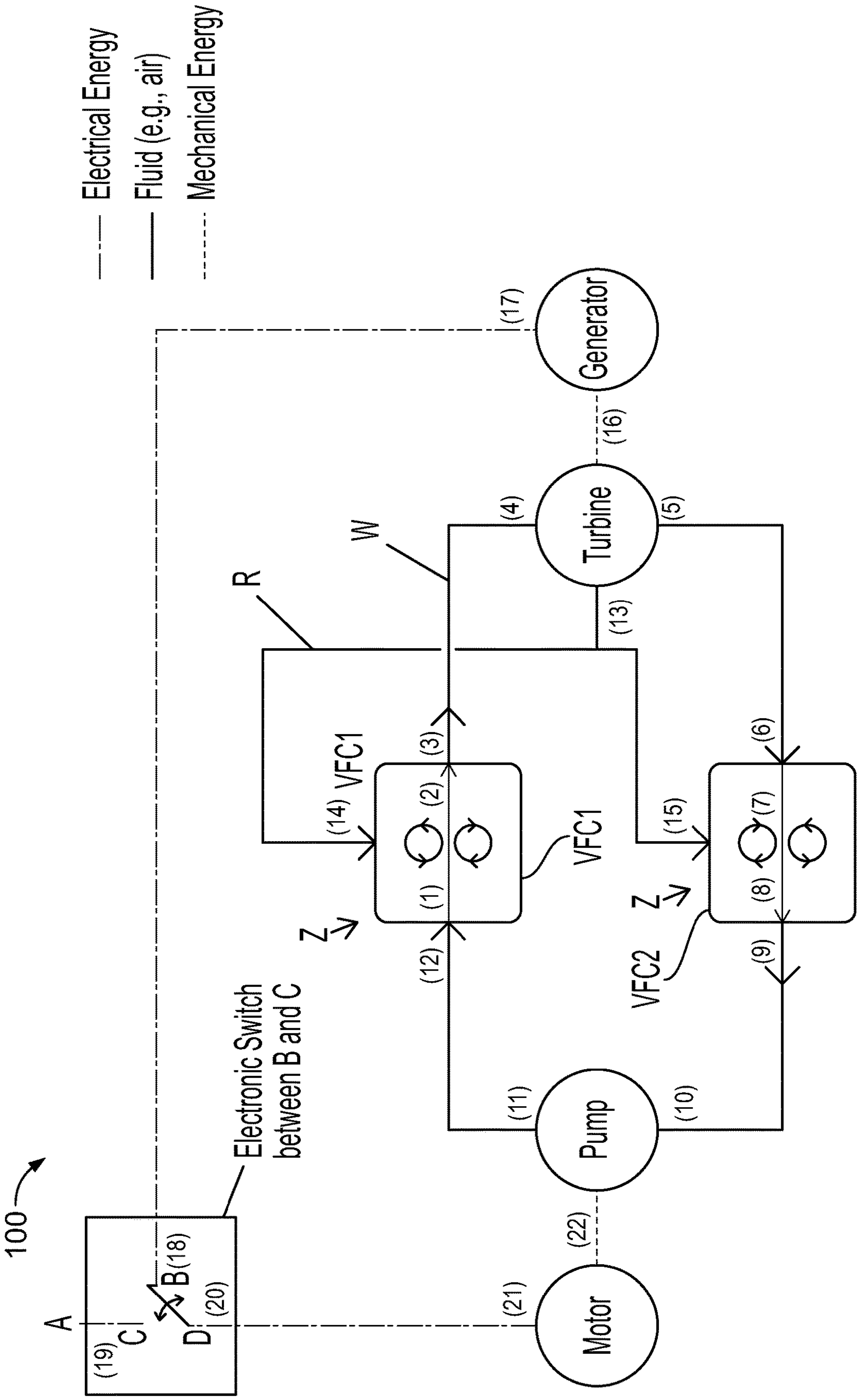
FIG. 3 illustrates a system to convert thermal energy into electrical energy. The system can incorporate one or more of the Venturi devices of FIGS. 1 and 2.

FIG. 3 illustrates a system 100 for converting thermal energy from an ambient environment into electrical energy. The system 100 can include a fluid loop (W) that circulates the primary flow of fluid. The fluid loop (W) can include tubing, conduits, pipes, etc. to circulate the primary flow fluid. The system 100 can include one or more Venturi devices (Z) (e.g., two), a pump, a turbine, a generator, a motor, and/or a switch. The one or more Venturi devices (Z) (e.g., two), pump, and/or turbine can be disposed on the fluid loop (W). The pump can be disposed between a first Venturi device (VFC1) and a second Venturi device (VFC2) on the fluid loop (W). The turbine can be disposed between the first Venturi device (VFC1) and the second Venturi device (VFC2) on the fluid loop (W). The first Venturi device (VFC1) can be disposed between the pump and the turbine on the fluid loop (W). The second Venturi device (VFC2) can be disposed between the pump and the turbine on the fluid loop (W). The primary flow can flow start at the pump and then flow through the first Venturi device (VFC1), turbine, and second Venturi device (VFC2) on the fluid loop (w) before reaching the pump again to recirculate. As described herein, a recirculation conduit, flow line, or secondary flow conduit (R), which can be the same as conduit (G) described in reference to FIG. 1, can route a portion of the primary flow (e.g., secondary flow) from the fluid loop (W) and back to the first Venturi device (VFC1) and second Venturi device (VFC2) to create vortices therein, as described above in reference to FIG. 1, to generate a suction to facilitate the harvesting of thermal energy from the ambient environment outside the first Venturi device (VFC1) and second Venturi device (VFC2). In some configurations, the recirculation conduit (R) can direct the secondary flow, pulled from the primary flow, from the fluid loop (W) at the turbine or pump to the first Venturi device (VFC1) and second Venturi device (VFC2). The generator can generate electrical energy from the mechanical energy of the turbine as the primary flow drives the turbine. The generator can be electrically connected, by way of a switch, to the motor such that electrical energy from the generator can power the motor. The motor can power the pump. When the generator is providing insufficient electrical energy to power the motor, the switch can be in a position to provide external electrical energy by way of the line A to the motor.

As described herein, the Venturi devices (Z) can harvest thermal energy from an ambient environment outside the Venturi device (Z) and charge a primary flow of fluid through the Venturi device (Z) with that harvested energy.

For example, a temperature of the primary flow of fluid through the Venturi device (Z) can decrease such that heat is transferred through the walls of the bodies of the Venturi device s (Z) (e.g., the first Venturi device (VFC1) and second Venturi device (VFC2)) to the primary flow of fluid, thereby charging the primary flow of fluid with thermal energy from the ambient environment (e.g., air) outside the Venturi device (Z), to drive a turbine, which drives a generator to produce electricity.

It can be assumed that neither frictional losses, dissipation losses nor the conversion losses between the individual forms of energy occur. If the electrical switch (in FIG. 3 top left) is set to position C, starting from point A, electrical energy can be directed to the motor, which starts to drive a pump. It is also assumed that this pump drives a primary flow of a fluid, which can be a gas such as air. This primary flow passes through the points (11), (12), (1), (2), (3), (4), (5), (6), (7), (8), (9) and (10) of a fluid loop, which can be connected by way of tubing, pipes, conduits, and the like, and thus circulates in a circuit (e.g., fluid loop) which links the apparatus pump, VFC1 (e.g., first Venturi device (K)), turbine, and VFC2 (e.g., second Venturi device (K)). This circulating flow can be referred to as the primary flow. The primary flow can cause two effects. First, the turbine can be driven, which drives the generator, which in turn results in that electrical energy can be taken off in the form of electricity. Second, at point (13), a secondary flow is directed via points (14) and (15) into the VFC1 and VFC2 where it rejoins the primary flow, as detailed herein with reference to the secondary flow being directed into the primary flow. As a result, the vortices described above are formed in the VFCs, which generate a suction on the back of the VFCs (points (1) and (7)).

As described above, in the VFC, a vortex is formed which generates a suction on one side (positions (1) and (7)), and an increased pressure on the other side (positions (2) and (8)). On the suction side, the intake of the primary flow, in combination with the Venturi effect, causes the primary flow to undergo cooling so that thermal energy is absorbed from the environment in the form of heat. This absorbed energy on the pressure side causes the pressure to continue to increase and thus also be returned to the VFC via the secondary air flow. This in turn increases the swirl of the vortex, which in turn increases the suction effect and the associated cooling or the transport of heat into the circulating fluid. It is therefore a self-amplifying loop driven by the heat energy present in the environment.

On the pressure side, this absorbed energy means that the pressure in position (13) continues to increase and is thus also returned to the VFCs via the secondary flow. This in turn leads to an increase in the vortex in the VFCs, which in turn increases the suction effect and the associated cooling or transport of heat into the circulating fluid. It is therefore a self-reinforcing cycle driven by the heat energy present in the environment. At the same time, the fluid, which can be air, that is circulated through the pump, VFC1, turbine and VFC2 is energetically charged (increase in internal energy). This energy can be converted into electrical energy via the turbine and generator in such a way that energy losses, for example due to friction, can be compensated for by always being able to drive the pump at full power. The circulation of the fluid in the closed circuit of the pump, VFC1, turbine and VFC2 as well as the secondary air flows can be maintained. The system 100 can be referred to as a "VFG" ("Vortex Fusion Generator").

As described herein, the characteristics of the system 100 can include:

thermal energy (e.g. from the environment) is transferred to a flowing fluid medium by means of one or more VFCs by increasing the internal energy of the flowing fluid medium (which can be referred to as "charging of the fluid medium"), internal energy can be withdrawn from the flowing fluid medium (which can be referred to as "discharging the fluid medium"), and part of the energy withdrawn from the flowable medium can compensate for energy losses caused by friction, dissipation (this also can include the effects of electrical resistance in the event that electrical currents flow) and/or conversion losses, the VFG can provide energy such that the cycle of charging and discharging of the flowing flowable medium is maintained (operating energy).

If the energy produced by the generator has reached a level sufficient to fully drive the motor, the electrical switch can be set to position B, thereby the system 100 may generate power without an external electrical power source, but instead, the thermal energy harvested by the system 100 can be sufficient to power the system 100.

Figure 4:
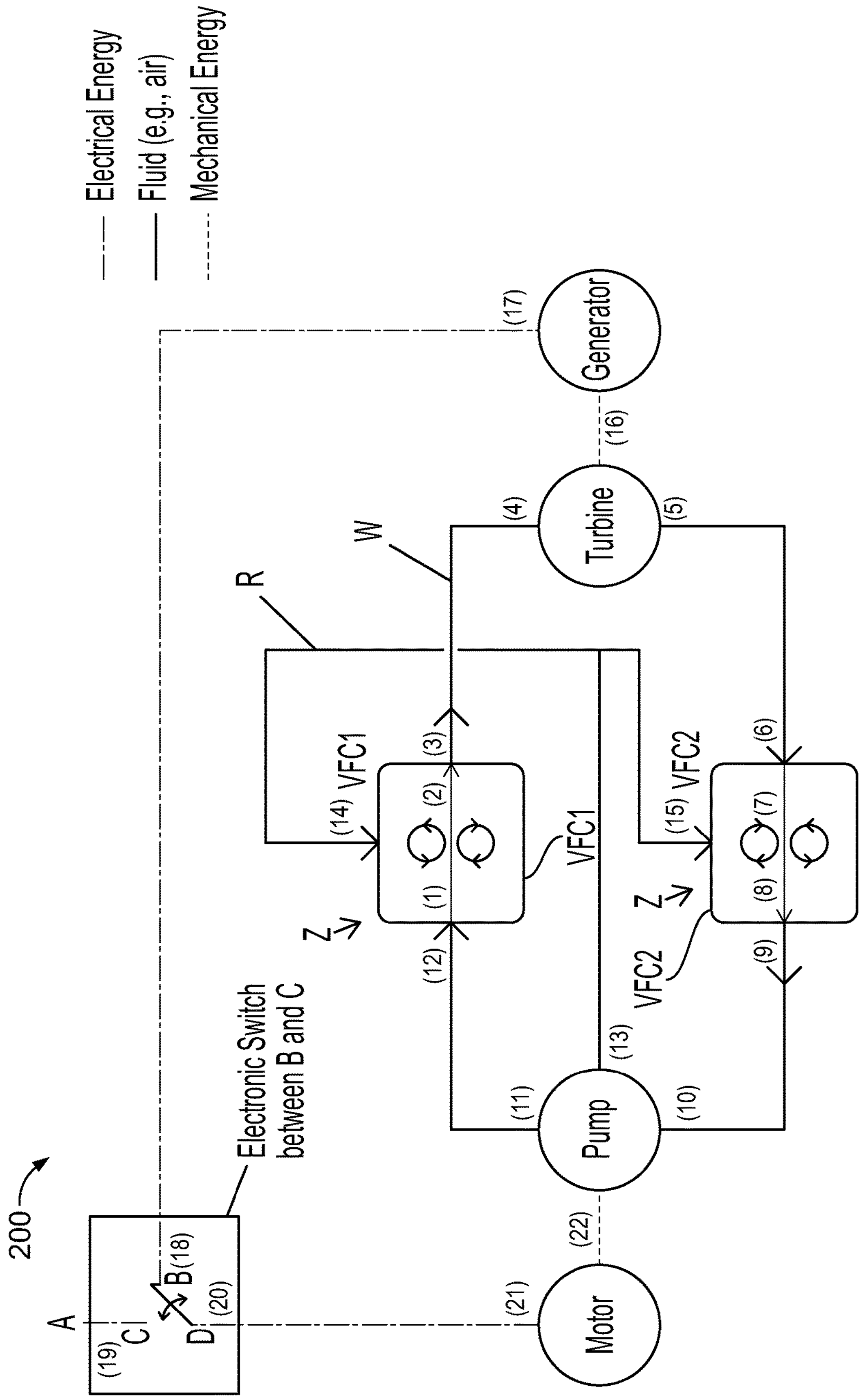
FIG. 4 illustrates a system to convert thermal energy into electrical energy. The system can incorporate one or more of the Venturi devices of FIGS. 1 and 2.

The VFG can be modified such that the secondary flow starts at position 13 in the VFG, as seen in FIG. 4, at the pump and not at the turbine.

In some configurations, excess energy from the system 100 can be stored in batteries in the form of electrical energy or fed into an electrical power grid.

The system 100 may also facilitate energy to be taken from an ambient environment at low temperature levels. The Carnot efficiency of a VFG at $T_{warm}$=293 K and $T_{cold}$=283 K (difference=10 K) and an ordinary heat engine at $T_{warm}$=1273 K and $T_{cold}$=1229 K (difference=44 K) according to formula 1 would be the same. With a lower temperature difference, a VFG can thus achieve the same efficiencies, and the demands on the materials can be lower due to the lower temperature.

The principle of the VFG shown in FIG. 3 is not restricted in the number of VFCs used. In principle, the use of one VFC is sufficient, but 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 or more than 100 VFC's can be combined in one VFG. One or more VFCs can thus be combined in a VFG.

The principle of the VFG shown in FIG. 3 is not limited in the number of pumps used. Characteristic of a pump is the generation of a flow in a free-flowing medium. The same applies to the number of engines.

The principle of the VFG shown in FIG. 3 is not limited in the number of turbines used. Characteristic of a turbine is the withdrawal of internal energy from a free-flowing medium. These turbines can be freely connected to any number of electrical generators.

The flow of fluid (e.g., air) in a VFG can be guided in any way (e.g. in the form of a cascade). However, it is also possible for fluid to be fed into the VFG at one point and out of the VFG at another point and discharged into the environment. In this case, the proportion of the operating energy required for the operation of the VFG increases in relation to the energy that the flowable medium has when discharging was removed. The number of turbines and generators is also not limited. As described herein, the charging of the flowable medium (e.g., air) in one or more VFCs or vortex fusion chargers can be accomplished with thermal energy from the environment and the conversion of this energy into another form of energy, for example electrical energy.

Thermal energy can thus be converted into mechanical energy and ultimately into electrical energy by means of the suction-acting mechanisms in the VFC. The advantage of the presented VFG is that low-value thermal energy (ambient temperature) can be converted into higher-value energy (electricity). The VFG accomplish the foregoing based on the suction effect.

The VFG and VFC can be used with any flowable media, which can include at least those recited herein.

Supercharger System for an Internal Combustion Engine

A turbocharger is a kind of engine charging. It increases the engine power or the efficiency of internal combustion engines. Its mode of operation is to use a part of the energy of the engine exhaust gas by means of a turbine within the exhaust system, which drives a so-called compressor, which increases the pressure in the intake system and thereby, inter alia, more combustion air is provided compared with a non-supercharged naturally aspirated engine.

A turbocharger consists of at least one exhaust gas turbine that uses energy (thermal energy, e.g., heat energy, in part also kinetic energy, e.g., kinetic energy) of the exhaust gases emitted, as well as a compressor driven by this turbine for the intake air of the engine, which increases the air flow and the intake work of the piston is reduced. The transmission of the kinetic energy from the exhaust gas turbine to the compressor via a transmission shaft.

Turbochargers are usually designed to take advantage of the pressure of the exhaust gases (congestion charging), some can also use their kinetic energy (shock charging). Most of the compressor is followed by a charge air cooler, which can achieve better filling at a lower temperature in the cylinder. The goal is usually to increase the cylinder filling.

Modern turbochargers can reach speeds of up to 290,000 revolutions per minute (for example, smart three-cylinder turbodiesel). For such high speeds, the turbocharger shaft must be stored in a hydrodynamic plain bearing. Some turbochargers have connections for the cooling water circuit in addition to the oil supply connections.

The superchargers described herein is based on the use of fluid dynamic mechanisms. The superchargers directly convert the energy stored in the exhaust gases into an effect on the loading of the engine with combustion air without the need for moving parts. The superchargers include the vortex fusion charger (e.g., the Venturi device (Z)).

The supercharger described herein is low maintenance having little or no moving parts. In addition, supercharger increases fuel utilization and thus decreases the effective fuel consumption.

Figure 5:
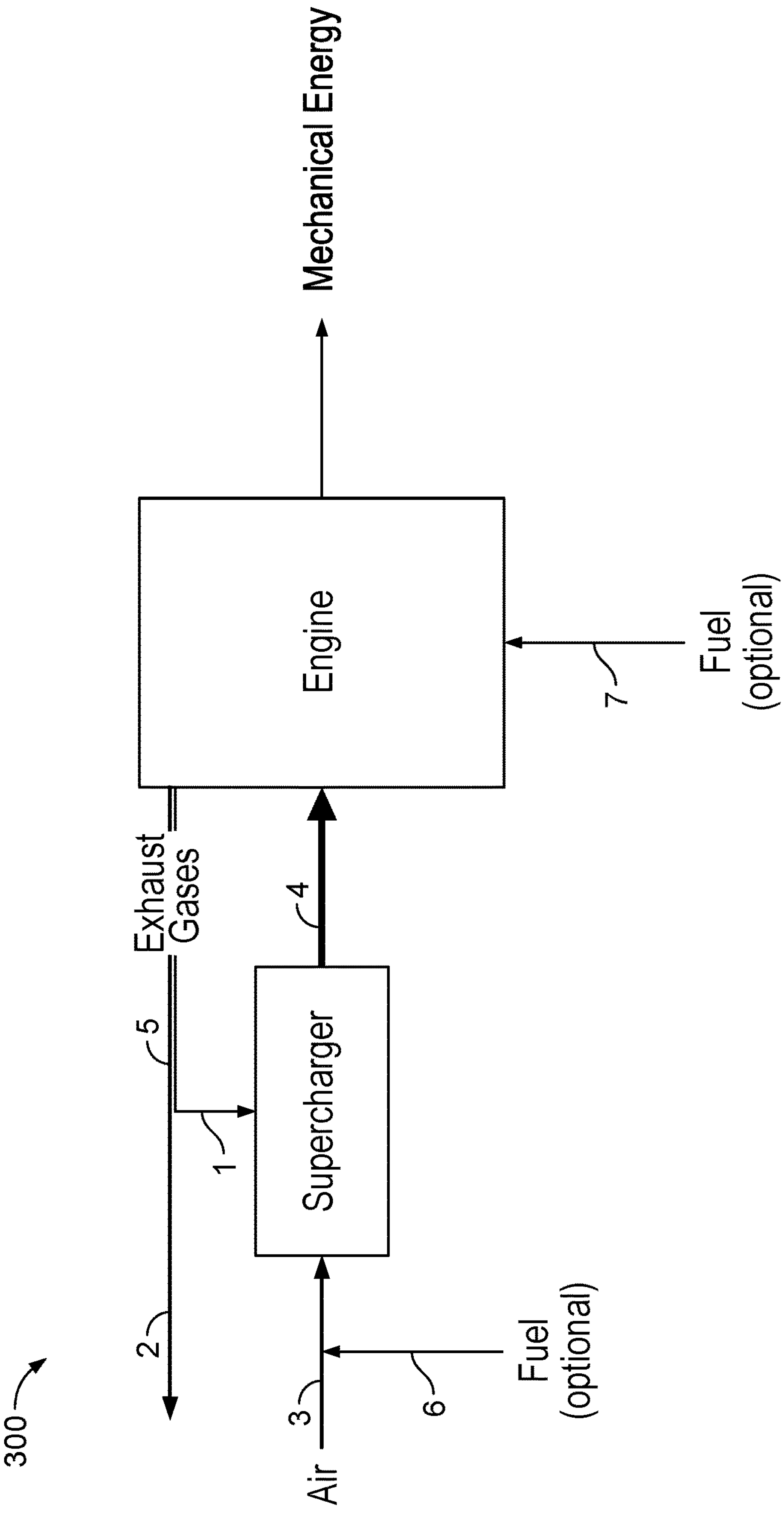
FIG. 5 illustrates a supercharger to charge an engine with energy from exhaust gases. The supercharger can incorporate one or more of the Venturi devices of FIG. 1.

The integration of the supercharger with an engine is shown in FIG. 5. Energy from the exhaust gases (stream 5 in FIG. 5) can be used to charge the engine with an increased amount of combustion air and fuel. For this purpose, a part of the exhaust gases (stream 1 in FIG. 5) can be branched off from the engine exhaust gases (stream 5 in FIG. 5) and fed into the Supercharger. The remainder of the exhaust gases (stream 2 in FIG. 6) can be discharged into the environment as usual. The energy conducted into the supercharger with the current 1 can used via fluid dynamic mechanisms to draw in air (stream 3 in FIG. 5) and to direct it into the engine (stream 4 in FIG. 5). Depending on the type of engine, the fuel can be introduced differently in the internal combustion engine. In the case of a gasoline engine, it can be injected into the intake air stream (stream 6 in FIG. 5). In a diesel engine, the fuel can be injected directly into the combustion chamber (stream 7 in FIG. 5).

Figure 6:
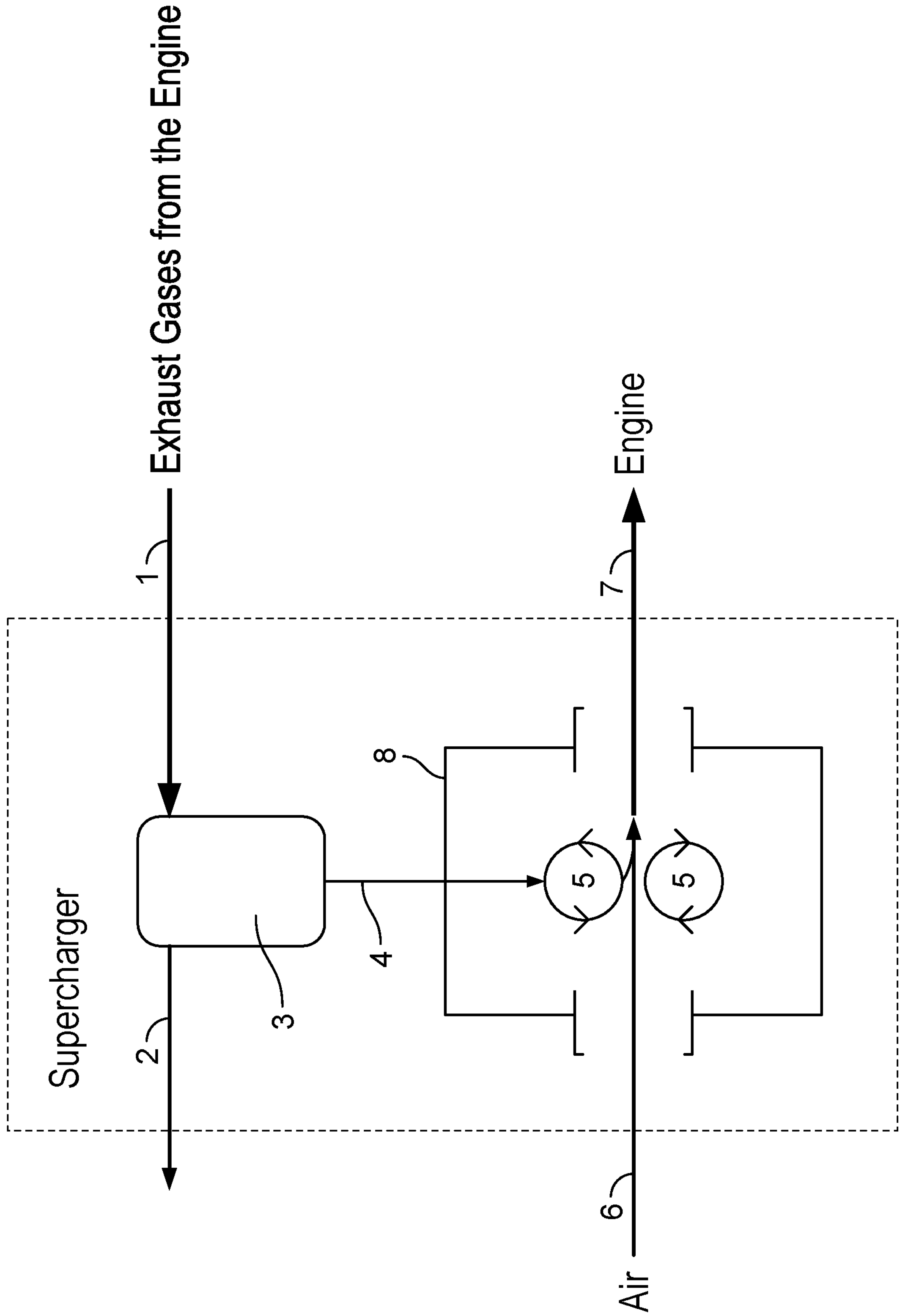
FIG. 6 illustrates a schematic of the supercharger illustrated in FIG. 5.

The mode of action of the supercharger can be subdivided into three subfunctions (see FIG. 6).

The first subfunction: Part of the exhaust gas flow (stream 1 in FIG. 6) can be loaded into a buffer element (compartment 3 in FIG. 6). In FIG. 6, this mechanism can be visualized by the fact that the input stream (1) in compartment (3) is represented by a thicker arrow than the output stream (2), which leaves compartment (3). This branched off part of the exhaust gas stream can be under an increased pressure. This pressure can be between 1 bar and 2 bar inclusive, between 2 bar and 3 bar inclusive, between 3 bar and 4 bar inclusive, between 4 bar and 5 bar inclusive, between 5 bar and 6 bar inclusive, between 6 bar and 7 bar inclusive between 7 bar and 8 bar inclusive, between 8 bar and 9 bar inclusive, between 9 bar and 10 bar inclusive and higher than 10 bar. This branched off part of the exhaust gas stream can have an elevated temperature. This temperature may be between 20° C. and 30° C. inclusive, between 30° C. and 40° C. inclusive, between 40° C. and 50° C. inclusive, between 50° C. and 60° C. inclusive, between 60° C. and 70° C. inclusive, between 70° C. and 80° C. inclusive, between 90° C. and 100° C. inclusive, between 100° C. and 110° C. inclusive, between 110° C. and 120° C. inclusive, between 120° C. and 130° C. inclusive, between 130° C. and 140° C. inclusive, between 140° C. and 150° C. inclusive, between 150° C. and 160° C. inclusive, between 160° C. and 170° C. inclusive, between 170° C. and 180° C. inclusive, between 190° C. and 200° C. inclusive, between 200° C. and 210° C. inclusive, between 210° C. and 220° C. inclusive, between 220° C. and 230° C. inclusive, between 230° C. and 240° C. inclusive, between 240° C. and 250° C. inclusive, between 250° C. and 260° C. inclusive, between 260° C. and one then 270° C., between 270° C. and 280° C. inclusive, between 290° C. and 300° C. inclusive, between 300° C. and 310° C. inclusive, between 310° C. and 320° C. inclusive, between 320° C. and including 330° C., between 330° C. and 340° C. inclusive, between 340° C. and 350° C. inclusive, between 350° C. and 360° C. inclusive, between 360° C. and 370° C. inclusive, between 370° C. and including 380° C., between 390° C. and 400° C. inclusive, between 400° C. and 410° C. inclusive, between 410° C. and 420° C. inclusive, between 420° C. and 430° C. inclusive, between 430° C. and inclusive 440° C., between 440° C. and 450° C. inclusive, between 450° C. and 460° C. inclusive, between 460° C. and 470° C. inclusive, between 470° C. and 480° C. inclusive, between 490° C. and inclusive 500° C. and higher than 500° C. The stored energy (in the form of increased pressure and temperature) in the exhaust gases can be used to realize the two other subfunctions. The buffer element (compartment 3 in FIG. 6) can act similarly to an electric accumulator, which provides energy in the form of an operating voltage for an amplifier and introduces this energy via an electrical current in the amplifier. Here, the operating voltage can correspond to the increased pressure or the elevated temperature of the exhaust gas stored in the buffer element. The electric current corresponds to the stream (stream 4 in FIG. 6) that out of the buffer element (compartment 3 in FIG. 6), which can be conducted into the charging element (compartment 8 in FIG. 6).

The second subfunction: This subfunction is induced by the stream (stream 4 in FIG. 6), which can be conducted from the buffer element (compartment 3 in FIG. 6) into the charging element (compartment 8 in FIG. 6). The second subfunction can be realized in this charge element and involves the creation of a vortex (detail 5 in FIG. 6). The vortex can be generated as described herein.

The third subfunction: The energy of the vortex originally comes from the exhaust gases (realized in a conventional turbocharger with the exhaust gas turbine). The vortex itself creates a vacuum on one side, sucking in ambient air (optionally together with fuel) and compressing it on the opposite side (realized in a conventional turbocharger with the compressor). The sucked ambient air is shown in FIG. 6 as stream 6. The compressed ambient air is fused with the exhaust stream (stream 4 in FIG. 6) by the vortex and is shown in FIG. 6 as stream 7. Stream 7 can be fed as a load into the internal combustion engine. When the supercharger is used in a vehicle, the effect of these three subfunctions can be enhanced by the effect of the wind creating a back pressure on the front of the vehicle. This back pressure can then support the intake of the ambient air by the Supercharger.

Figure 7:
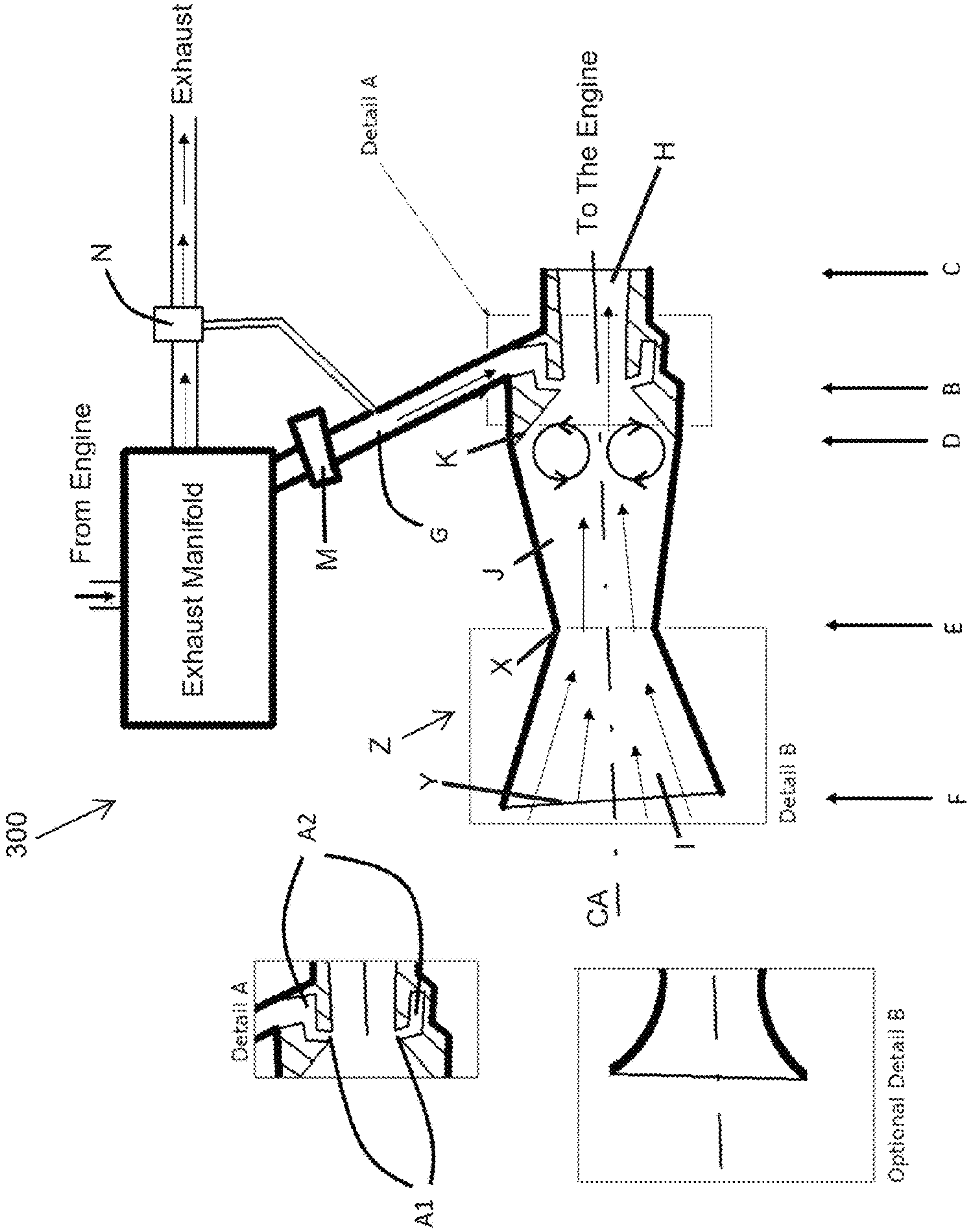
FIG. 7 illustrates a detailed schematic of the supercharger illustrated in FIGS. 5 and 6. The supercharger, as illustrated, incorporates the Venturi device of FIG. 1.

One configuration of the supercharger is shown schematically in FIG. 7. The buffer element corresponding to the description according to FIG. 6 (there compartment 3) is represented in FIG. 7 by the compartments G, M, and N. The exhaust gases from the engine flow into the exhaust manifold. One of the possible routes from the manifold (e.g., an exhaust outlet conduit) can be blocked by a buttery fly valve (e.g., pressure-controlled modified butterfly valve) (compartment N in FIG. 7). The other route (G) (e.g., conduit) can go over a one way check valve (e.g., Tesla one way check valve, valvular conduit, fixed geometry passive check valve, a main channel and a series of loops oriented to facilitate flow in one direction and resist flow in the opposite direction), which can be open for the passage. This can allow the hard transfer line (compartment or conduit G in FIG. 7) to be filled with the exhaust gas. The pressure in conduit (G) can increase. When the pressure in the conduit (G) has reached a certain level, the butterfly valve (N) can open via a coupled pressure line. The exhaust gas can be discharged as usual into the environment via the exhaust outlet conduit. The exhaust gas buffered in conduit (G) can be passed into the Venturi device (Z) through the annular chamber (annular chamber A2 in FIG. 7) and into an interior of the Venturi device (Z) by way of the secondary input (A1 in FIG. 7), as described herein with respect to FIG. 1. This drain reduces the pressure in (G). As a result, the butterfly valve (N) can be throttled again. Again, more exhaust gas can be directed into the line (G). The pressure in conduit (G) can increase. The compartments G, M, and N can form a buffer element which provides an operating pressure in an constant manner. As a check valve (M), a Tesla valve may be suitable (as described in U.S. Pat. No. 1,329,559).

The charging element (corresponding to compartment 8 in FIG. 6) is shown schematically in FIG. 7 in a sectional view below the compartments G, H and I. In order to describe the geometry of this tube, distinctive positions of the axis are marked by arrows and the letters B, C, D, E and F. As described above, exhaust gases are introduced from the pipe (G) via the annular chamber A2 and the secondary input (A1) (e.g., ring gap) into the interior of the Venturi device (Z). In the area of (D) of the charging element (e.g., Venturi device (K)) a vortex may be formed, as described in reference to FIG. 1. This vortex creates a vacuum at the inlet (Y) (location F). As a result, ambient air can be sucked into the Venturi device (Z) via the inlet (Y) and the throat (E) (e.g., construction). Since this air is compressed on the other side of the vortex (in direction C), the area of the pipe between (B) and (E) may be called a compression chamber. Ambient air and exhaust gases are fused at the position corresponding to (B) and are pressed into the combustion chamber of the engine to supercharge the engine.

The diameter of the inlet opening (F) may be different depending on driving speed (if the Supercharger is to be used in a vehicle). At higher driving speeds, the inlet opening (F) may be reduced. At lower driving speeds, the inlet opening may be enlarged. The size of the inlet may also be adjusted with relation to engine size, horsepower and vehicle top speed.

Further, the inlet of ambient air (optional Detail B in FIG. 7) could be formed like velocity stack allowing smooth and even entry of air at high velocities. Here, also resonance effects can be observed which promote the induction of the generation of the vortex. In addition, the inside wall of the Venturi device (Z) can include a radius entry and/or "plenum." A velocity stack, trumpet, or air horn, is a trumpet-shaped design having differing lengths which can be used at the inlet (Y). These designs can allow smooth and even entry of air at high velocities with the flow stream adhering to the walls—known as laminar flow. Modify the dynamic tuning range of the intake tract by functioning as a resonating pipe which can adjust the frequency of pressure pulses based on its length within the tract. Modern engines can have tuned intake tract volumes and associated resonance frequencies, designed to provide higher than atmospheric intake air pressure while the intake valves are open-increasing the density of the trapped air in the combustion chamber (higher compression).

The systems, superchargers, supercharger systems, and Venturi devices (K) can be made with varying dimensions. Some non-limiting example dimensions for the super charger according to FIG. 7 are below:

- Length between (D) and (C)=between 6.00 inches and 7.00 inches
- Ring gap (A1)=between 0.001 inches and 0.003 inches.
- Inner diameter (further referred as "I.D.") at B=between 1.57 and 1.68 inches
- Reduction angle between (D) and (B)=between 35° and 55°
- Reduction angle between (C) and (B)=between 55° and 65°
- I.D. at (C)=between 1.63 inches and 2.05 inches
- I.D. at (D)=between 3.25 inches and 4.01 inches
- Length between (D) and (E)=between 4.50 and 6.00 inches
- Reduction angle between (D) and (E)=30° and 53°
- I.D. at (E)=between 1.25 inches and 2.35 inches
- Reduction angle between (F) and (E)=between 33° and 41°
- Length between (F) and (E)=between 4.00 inches and 6.00 inches
- (G) is steel tubing with I.D. of between 0.75 inches to 1.00 inches
- (M) is Tesla One Way Valve with I.D. of between 1.25 inches to 1.95 inches
- (N) is modified pressure activated heat riser butterfly valve
- (F), the inlet (Y), can be made of elastic polymer or programmable metallic polymer in order to adjust opening in correspondence to incoming intake pressure. Area between (E) and (F) can be made of an elastic polymer or a programmable metallic polymer to adjust the opening according to the input pressure applied (e.g. different dynamic pressure at different driving speeds if the supercharger should be installed in a vehicle).

At the ring gap (A1) a Coanda profile of 40° to 70° can be applied.

A method for converting thermal energy into electrical energy or another form of energy, characterized in that for the conversion of heat into electrical energy or another form of energy, a heat engine is used, which is based on a suction effect. The suction effect can be generated by a vortex in a flowable medium. The generation of the vortex can be caused directly by the flow of a free-flowing medium. Due to the suction effect, flowable medium can be sucked in, there can be a drop in temperature in the flowable medium sucked in, and the flowable medium sucked in can absorb energy in the form of heat and thus increases its internal energy. The energy absorbed in the flowable medium can be withdrawn from the medium again. The energy stored in the flowable medium can be withdrawn via a combination of turbine and electric generator. The energy withdrawn can be withdrawn in the form of electrical energy. The generation of the vortex can take place in a component (hereinafter referred to as "VFC"), which resembles a tube and whose inner diameter can assume different values along its axis. The component can have an opening into which a flowable medium can be introduced. A vortex can be generated in the interior of the component, which can cause the suction effect. Flowable medium can be sucked in on one side of the vortex and expelled on the other side of the vortex. The flowable medium can flow through the component by flowing in at the front and out at the back. Thermal energy can be transferred to a flowing fluid medium by one or more VFC's. By increasing the internal energy of the fluid medium, this process can be referred to as "charging." Internal energy can be withdrawn from the flowing fluid medium, which can be referred to as "discharge." A part of the energy withdrawn by means of discharge can be fed to the apparatus to compensate for energy losses in such a way that the cycle of charging and discharging of the flowing flowable medium is maintained.

A method in which the energy from the exhaust gases of internal combustion engines is used to charge them with ambient air or to charge them with a mixture of ambient air and fuel (turbocharger). In some configurations, no mechanically moving components or mechanically moving device compartments may be used. A vortex may be generated in an apparatus by means of a gas flow. This vortex may create a vacuum or negative pressure on one side. Ambient air or a mixture of ambient air and fuel may be sucked in by means of this negative pressure. This ambient air or mixture of ambient air and fuel can be expelled or compressed on the other side of the vortex and directed into the internal combustion engine. The vortex can be induced by exhaust gases from the internal combustion engine.

The systems, devices, and components thereof can be made of a variety of materials such metals (such as steel, aluminum, and/or others), metal alloys, polymers (such as plastic), ceramics, shape memory materials, and/or other suitable materials. The systems, devices, and components thereof can be galvanized, painted, zinc coated, powder coated, vinyl coated, plasti dripped, textured, and/or finished with other materials or methods.

Although the systems and methods have been disclosed in the context of certain embodiments and examples, it will be understood by those skilled in the art that the systems and methods extend beyond the specifically disclosed embodiments to other alternative embodiments and/or uses of the embodiments and certain modifications and equivalents thereof. Various features and aspects of the disclosed embodiments can be combined with or substituted for one another in order to form varying modes of the conveyor. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Some embodiments have been described in connection with the accompanying drawings. Components can be added, removed, and/or rearranged. Orientation references such as, for example, "top" and "bottom" are for ease of discussion and may be rearranged such that top features are proximate the bottom and bottom features are proximate the top. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various embodiments and examples of juicing devices and methods have been disclosed. Although the systems and methods have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow.

What is claimed is:

1. A supercharger system for an internal combustion engine, the supercharger system comprising:
a Venturi device comprising:
an inlet configured to receive a primary flow of gas;
an outlet;
a body disposed between the inlet and the outlet, the body comprising a converging portion and a diverging portion, the converging portion configured to increase a velocity of the primary flow of gas and decrease a pressure of the primary flow of gas, and the diverging portion configured to decrease the velocity of the primary flow of gas and increase the pressure of the primary flow of gas, wherein the body further comprises a check valve disposed in the converging portion;
an annular chamber configured to receive a secondary flow of an exhaust gas from the internal combustion engine; and
a secondary input configured to encircle the primary flow and direct the secondary flow from the annular chamber radially inward into the primary flow of gas at a position downstream of the converging portion to create a vortex configured to produce a suction at the inlet to suck the primary flow through the inlet and into the body and to mix the primary flow and the secondary flow together before flowing through the outlet to the internal combustion engine.

2. The supercharger system of claim 1, further comprising an exhaust manifold, a conduit from the exhaust manifold to the annular chamber, a check valve disposed along the conduit, an exhaust outlet conduit configured to direct the exhaust gas from the exhaust manifold to an ambient environment, and a butterfly valve disposed along the exhaust outlet conduit.

3. The supercharger system of claim 1, wherein the secondary input is an annular passageway.

4. The supercharger system of claim 1, wherein the secondary input comprises a plurality of apertures.

5. The supercharger system of claim 1, wherein the secondary input comprises an annular gap.

6. The supercharger system of claim 1, wherein the converging portion is a first converging portion and further comprising a second converging portion starting between the diverging portion and the secondary input.

7. The supercharger system of claim 6, wherein the second converging portion comprises a cross-sectional flow area that continuously decreases in size in a direction of flow of the primary flow.

8. The supercharger system of claim 6, wherein a cross-sectional flow area of the second converging portion converges to a size that is smaller than a cross-sectional flow area of the first converging portion and a cross-sectional flow area of the diverging portion.

9. The supercharger system of claim 1, wherein the secondary input is configured to direct the secondary flow into the primary flow at an angle relative to a direction of flow of the primary flow.

10. The supercharger system of claim 1, wherein the annular chamber comprises a Coanda surface configured to distribute incoming secondary flow throughout the annular chamber.

11. The supercharger system of claim 1, wherein the secondary input comprises a Coanda surface.

12. A supercharger system for an internal combustion engine, the supercharger system comprising:
a Venturi device comprising:
an inlet configured to receive a primary flow of gas;
an outlet;
a body disposed between the inlet and the outlet, the body comprising a converging portion and a diverging portion, the converging portion configured to increase a velocity of the primary flow of gas and decrease a pressure of the primary flow of gas, and the diverging portion configured to decrease the velocity of the primary flow of gas and increase the pressure of the primary flow of gas, wherein the body further comprises a check valve disposed in the diverging portion;
an annular chamber configured to receive a secondary flow of an exhaust gas from the internal combustion engine; and
a secondary input configured to encircle the primary flow and direct the secondary flow from the annular chamber radially inward into the primary flow of gas between the converging portion and the outlet to create a vortex configured to produce a suction at the inlet to suck the primary flow through the inlet and into the body and to mix the primary flow and the secondary flow together before flowing through the outlet to the internal combustion engine.

13. The supercharger system of claim 12, wherein the primary flow comprises air from the ambient environment.

14. The supercharger system of claim 12, wherein the outlet is fluidically connected with an air intake of the internal combustion engine.

15. A Venturi device for a supercharger for an internal combustion engine, the Venturi device comprising:
an inlet configured to receive a primary flow of gas;
an outlet;
a body disposed between the inlet and the outlet, the body comprising a converging portion and a diverging portion, the converging portion configured to increase a velocity of the primary flow and decrease a pressure of the primary flow, and the diverging portion configured to decrease the velocity of the primary flow and increase the pressure of the primary flow, wherein the body further comprises a check valve disposed in the converging portion;
an annular chamber configured to receive a secondary flow of exhaust gas from the internal combustion engine; and
a secondary input configured to encircle the primary flow and direct the secondary flow from the annular chamber into the primary flow, between the converging portion and the outlet, at an angle relative to a direction of flow of the primary flow to create a vortex configured to produce a suction at the inlet to suck the primary flow through the inlet and into the body to mix the primary flow and the secondary flow together before flowing to the internal combustion engine.

16. The Venturi device of claim 15, wherein the secondary input is an annular passageway.

17. The Venturi device of claim 15, wherein the converging portion is a first converging portion and further comprising a second converging portion starting between the diverging portion and the secondary input.

18. The Venturi device of claim 17, wherein the second converging portion comprises a cross-sectional flow area that continuously decreases in size in the direction of flow of the primary flow.

19. The Venturi device of claim 17, wherein a cross-sectional flow area of the second converging portion converges to a size that is smaller than a cross-sectional flow area of the first converging portion and a cross-sectional flow area of the diverging portion.

20. The Venturi device of claim 17, wherein a reduction angle of the second converging portion is between 35 and 55 degrees.

21. The Venturi device of claim 15, wherein the angle is ninety degrees.

22. The Venturi device of claim 15, wherein the angle is between 60 and 120 degrees.

23. The Venturi device of claim 15, wherein a cross-sectional flow area of the outlet is smaller than a cross-sectional flow area of the inlet.

24. The Venturi device of claim 15, wherein the annular chamber comprises a Coanda surface configured to distribute incoming secondary flow throughout the annular chamber.

25. The Venturi device of claim 15, wherein the outlet comprises a cross-sectional flow area that continuously increases in size in a direction of flow of the primary flow.

26. The Venturi device of claim 15, wherein the secondary input is configured to direct the secondary flow of fluid into the primary flow at an angle relative to a direction of flow of the primary flow to create the vortex.

27. The Venturi device of claim 15, wherein the check valve is a fixed-geometry passive check valve.

* * * * *